(12) United States Patent
Noro

(10) Patent No.: US 8,935,552 B2
(45) Date of Patent: Jan. 13, 2015

(54) INFORMATION PROCESSING APPARATUS, COMPUTER-READABLE RECORDING MEDIUM, AND METHOD FOR CONTROLLING POWER CONSUMED IN INFORMATION PROCESSING APPARATUS

(75) Inventor: Masaaki Noro, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 304 days.

(21) Appl. No.: 13/561,702

(22) Filed: Jul. 30, 2012

(65) Prior Publication Data

US 2013/0055267 A1 Feb. 28, 2013

(30) Foreign Application Priority Data

Aug. 25, 2011 (JP) ................. 2011-184194

(51) Int. Cl.
- *G06F 1/32* (2006.01)
- *G06F 9/48* (2006.01)
- *H04W 52/02* (2009.01)

(52) U.S. Cl.
CPC ............ *G06F 9/4893* (2013.01); *G06F 1/3212* (2013.01); *G06F 1/3234* (2013.01); *G06F 1/3287* (2013.01); *H04W 52/0267* (2013.01); *Y02B 60/144* (2013.01)
USPC ........................................................ 713/320

(58) Field of Classification Search
CPC ............................ G06F 1/3212; G06F 9/44594
USPC .......................................................... 713/320
See application file for complete search history.

(56) References Cited

U.S. PATENT DOCUMENTS

| | | | |
|---|---|---|---|
| 6,289,399 B1 | 9/2001 | Furuichi et al. | |
| 2005/0138448 A1* | 6/2005 | Chew | ............................ 713/300 |
| 2009/0094473 A1 | 4/2009 | Mizutani | |
| 2011/0072292 A1* | 3/2011 | Khawand et al. | ............. 713/340 |

FOREIGN PATENT DOCUMENTS

| | | |
|---|---|---|
| JP | 11-73255 | 3/1999 |
| JP | 2009-93295 | 4/2009 |

* cited by examiner

*Primary Examiner* — Albert Wang
(74) *Attorney, Agent, or Firm* — Staas & Halsey LLP

(57) ABSTRACT

An information processing apparatus includes a processor that executes a plurality of application programs, a display that displays results of the execution of the plurality of application programs, and a storage that stores a first table in which the plurality of application programs and a plurality of pieces of operation information corresponding to the plurality of application programs are associated with each other and recorded, and a second table in which the plurality of application programs and order determined on the basis of power to be consumed by the processing unit to execute the plurality of application programs are associated with each other and recorded.

15 Claims, 31 Drawing Sheets

FIG. 7

| CLASS NAME | APPLICATION TYPE | | |
|---|---|---|---|
| 1 | USE OF GPS | REPRODUCTION OF MUSIC | |
| 2 | DATA COMMUNICATION | | |
| 3 | (NOT DEFINED) | | |

FIG. 8

| APPLICATION TYPES | ACCESS PERMISSION INFORMATION |
|---|---|
| USE OF GPS | READ HIGH-ACCURACY LOCATION INFORMATION |
| REPRODUCTION OF MUSIC | REPRODUCTION OF MUSIC |
| DATA COMMUNICATION | COMPLETE INTERNET ACCESS |

FIG. 9

| CHANGE POSSIBILITY | APPLICATION NAME LIST | | |
|---|---|---|---|
| CHANGE IMPOSSIBLE (PROVIDED BY SYSTEM) | TELEPHONE | | |
| CHANGE POSSIBLE (SPECIFIED BY USER) | | | |

FIG. 10

| CLASS NAME | APPLICATION NAME | | |
|---|---|---|---|
| 1 | NAVIGATION | MUSIC | |
| 2 | BROWSER | | |
| 3 | (NOT DEFINED) | | |

| CLASS NAME (511) | BATTERY REMAINING AMOUNT (552) |
|---|---|
| 1 | 50 |
| 2 | 30 |
| 3 | (NOT DEFINED) |

INFORMATION PROCESSING APPARATUS, COMPUTER-READABLE RECORDING MEDIUM, AND METHOD FOR CONTROLLING POWER CONSUMED IN INFORMATION PROCESSING APPARATUS

CROSS-REFERENCE TO RELATED APPLICATION

This application is based upon and claims the benefit of priority of the prior Japanese Patent Application No. 2011-184194, filed on Aug. 25, 2011, the entire contents of which are incorporated herein by reference.

FIELD

The embodiments discussed herein are related to an information processing apparatus, an information control program, and a method for controlling information.

BACKGROUND

When a peripheral device such as wireless communication or a Global Positioning System (GPS) is used by a mobile terminal such as a mobile phone, power consumption significantly increases. In order to extend the life of a battery of the mobile terminal, for example, a technique has been disclosed in which an Operating System (OS) and middleware have a function of permitting use of a peripheral device when an application prepares an Application Programming Interface (API) for declaring the beginning and the end of use of the peripheral device and uses the API. For example, there has been a technique in which a system monitors the operation of an application and detects the beginning and the end of access to a peripheral device.

In the above-described techniques, because both the OS and the application are to be corrected, it is difficult to additionally introduce the techniques to some of terminals that allow a user to freely download and install various applications, such as smartphones. It is also difficult to revise the format of each application package in such a way as to add, to each application package, a definition as to which peripheral device is to be used by the application package. When the operation of an application is continuously monitored, the application and an API are not corrected because the system detects use of a peripheral device by the application. However, when the operation of an application is continuously monitored, the system load increases due to the monitoring, thereby increasing the power consumption of the terminal and deteriorating the response of the system.

Examples of the related art include Japanese Laid-open Patent Publication No. 11-73255 and Japanese Laid-open Patent Publication No. 2009-93295.

SUMMARY

According to an aspect of the embodiments, an information processing apparatus includes a processor that executes a plurality of application programs, a display that displays results of the execution of the plurality of application programs, and a storage that stores a first table in which the plurality of application programs and a plurality of pieces of operation information corresponding to the plurality of application programs are associated with each other and recorded, and a second table in which the plurality of application programs and order determined on the basis of power to be consumed by the processing unit to execute the plurality of application programs are associated with each other and recorded, wherein when the processor detects a certain piece of operation information, the processor refers to the first table to detect an application program corresponding to the certain piece of operation information and refers to the second table to detect a place of the detected application program in the order, and when the processor detects that a remaining amount of electric charge of a power supply that supplies power to the information processing apparatus has become lower than a threshold, the processor terminates, in accordance with the order, application programs among the plurality of application programs that are being executed other than an application program whose result of execution is displayed on the display.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a diagram illustrating a class/application type correspondence table;

FIG. 8 is a diagram illustrating an application type/access permission information correspondence table;

FIG. 9 is a diagram illustrating a forced termination target exception list;

FIG. 10 is a diagram illustrating a forced termination target application list;

FIG. 15 is a diagram illustrating a battery remaining amount/class correspondence table;

DESCRIPTION OF EMBODIMENTS

Information processing systems according to embodiments will be described hereinafter.

Figure 1:
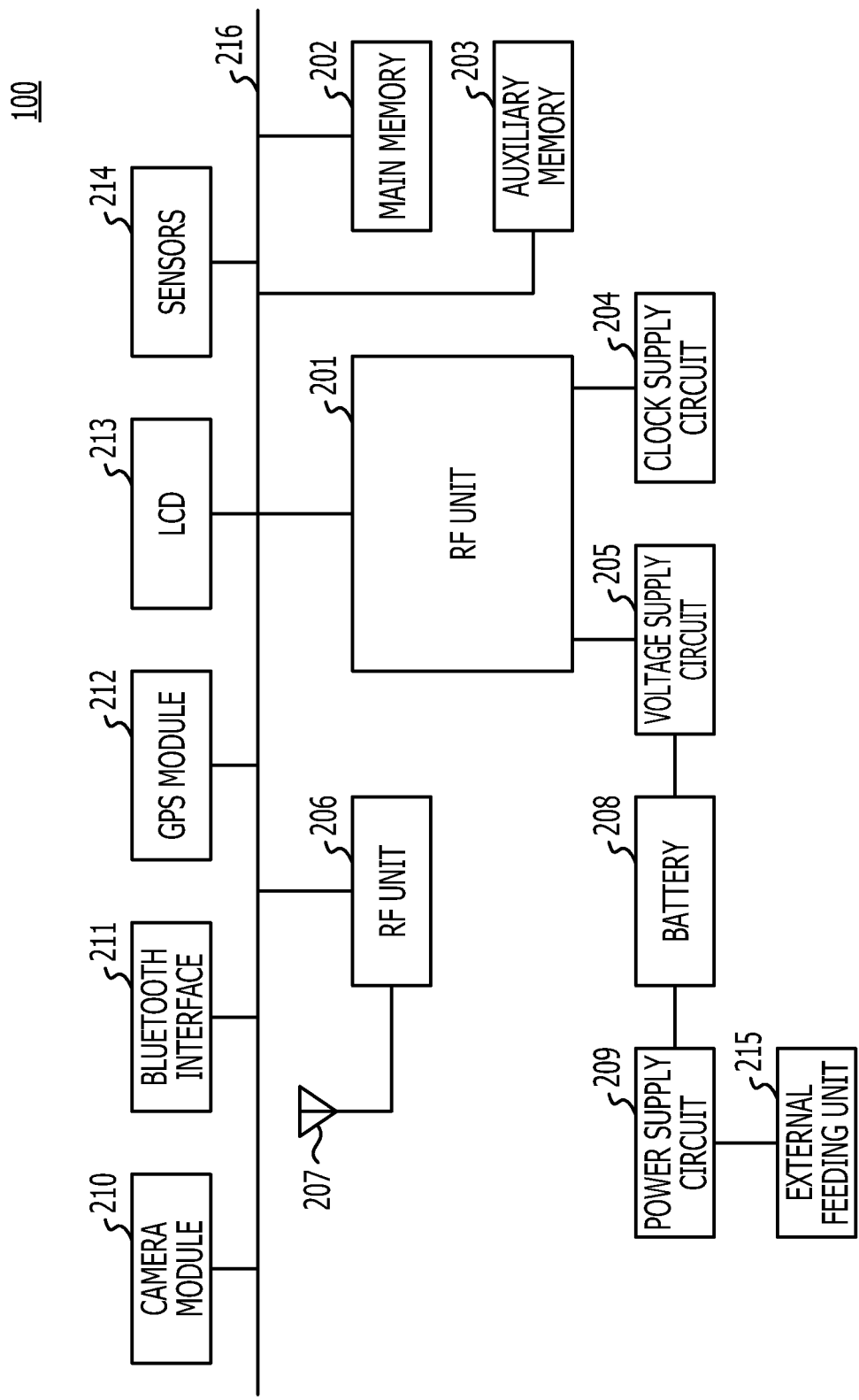
FIG. 1 is a diagram illustrating the hardware configuration of an information processing apparatus.

FIG. 1 is a diagram illustrating the hardware configuration of an information processing apparatus according to a first embodiment. An information processing apparatus 100 illustrated in FIG. 1 is, for example, a mobile information terminal such as a smartphone or a tablet personal computer (PC).

The information processing apparatus 100 includes a central processing unit (CPU) 201, a main memory 202, an auxiliary memory 203, a clock supply circuit 204, a voltage supply circuit 205, a radio frequency (RF) unit 206, an antenna 207, and a battery 208 as hardware modules. The information processing apparatus 100 also includes a power supply circuit 209, a camera module 210, a Bluetooth (registered trademark) interface 211, a GPS module 212, a liquid crystal display (LCD) 213, sensors 214, and an external feeding unit 215 as hardware modules. The hardware modules are coupled to one another by, for example, a bus 216.

The CPU 201 controls the entirety of the information processing apparatus 100. The CPU 201 is operated by a clock signal supplied from the clock supply circuit 204 and voltage supplied from the voltage supply circuit 205. The main memory 202 is, for example, a random-access memory (RAM). The main memory 202 is used as a work area of the CPU 201.

The auxiliary memory 203 is, for example, a non-volatile memory such as a hard disk or a flash memory. The auxiliary memory 203 stores various programs for operating the information processing apparatus 100. The programs stored in the auxiliary memory 203 are loaded into the main memory 202 and executed by the CPU 201. Thus, various programs that will be described later are executed by the information processing apparatus 100.

The clock supply circuit 204 supplies a clock signal of variable frequency to the CPU 201. The clock supply circuit 204 may be realized, for example, by a crystal oscillator that generates a clock signal, a real-time clock (RTC), and the like. The voltage supply circuit 205 supplies variable voltage to the CPU 201 using power supplied from the power supply circuit 209. The voltage supply circuit 205 may be realized, for example, by a voltage detector, a voltage regulator, and the like.

The RF unit 206 is controlled by the CPU 201 to realize a function of a transmitter that transmits a high-frequency signal from the antenna 207 to another wireless communication apparatus. The RF unit 206 also has a function of a receiver that converts a high-frequency signal received by the antenna 207 into a baseband signal and outputs the baseband signal to the CPU 201.

The battery 208 supplies power to the power supply circuit 209. The battery 208 may be realized, for example, by a battery such as a lithium-ion battery, an integrated circuit (IC) for protecting the battery, and the like. The power supply circuit 209 supplies power supplied from the battery 208 to each hardware module in the information processing apparatus 100. When an external power supply has been coupled to the external feeding unit 215, the power supply circuit 209 may supply power supplied from the external feeding unit 215 to each hardware module in the information processing apparatus 100. The power supply circuit 209 may be realized, for example, by a switching regulator and a voltage regulator.

The camera module 210 is controlled by the CPU 201 to capture an image of a subject and obtains image data generated by the capture. The Bluetooth interface 211 is a communication interface that is controlled by the CPU 201 to execute wireless communication with another communication apparatus through Bluetooth. In addition to the Bluetooth interface 211, the information processing apparatus 100 may include a wireless communication interface such as a wireless local area network (LAN).

The GPS module 212 is controlled by the CPU 201 to obtain positional information indicating the current position of the information processing apparatus 100 on the Earth by receiving a radio wave generated by an artificial satellite.

The LCD 213 is an image display apparatus that is controlled by the CPU 201 to display an image for a user. The LCD 213 may be a touch panel having a function of inputting a position, such as a touch pad.

The sensors 214 are controlled by the CPU 201 to obtain information indicating states of the inside of the information processing apparatus 100. The sensors 214 may include, for example, an acceleration sensor, a gyro sensor, an illumination sensor, a geomagnetic sensor, an inclination sensor, a pressure sensor, an approach sensor, and a temperature sensor.

Figure 2:
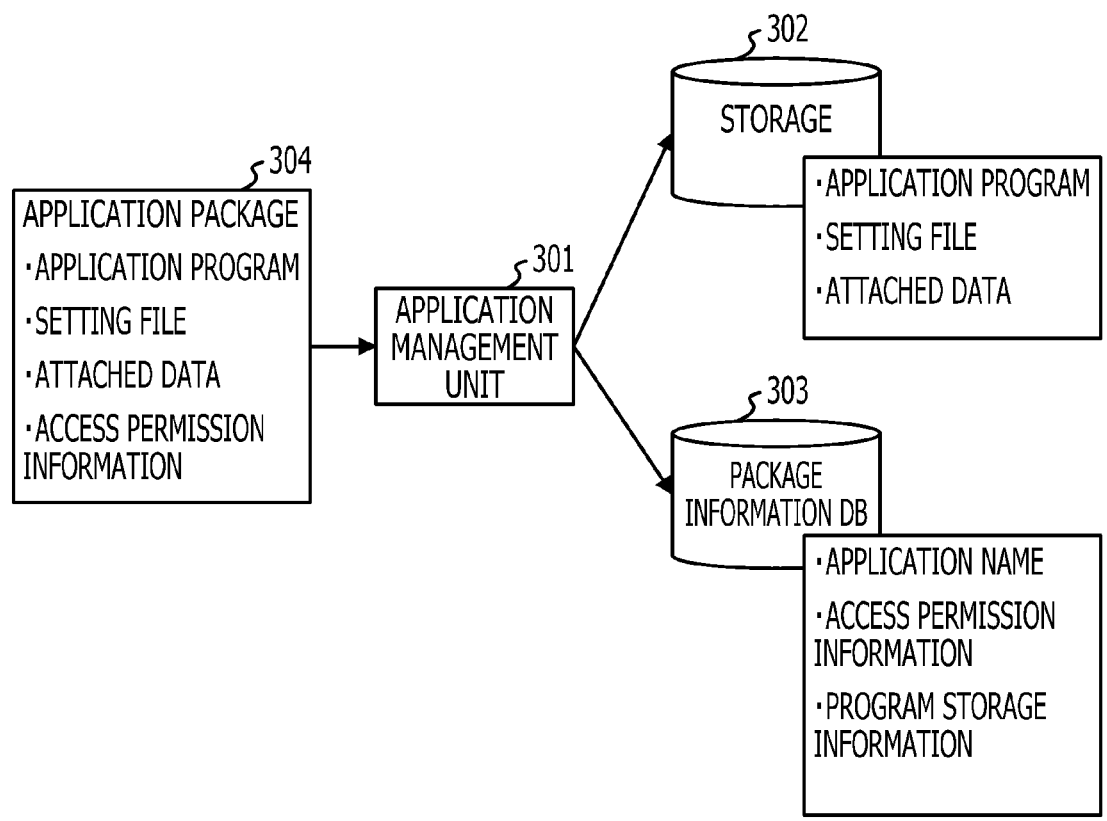
FIG. 2 is a diagram illustrating the configuration of an application package and components in which pieces of data are to be stored when the pieces of data are installed.

FIG. 2 is a diagram illustrating the configuration of an application package 304 and components in which pieces of data are to be stored when the pieces of data are installed according to the first embodiment.

Users of smartphones download, from networks, paid and free application packages provided by application developers around the world and use the application packages by installing the application packages on terminals. Therefore, for security purposes, access permission information indicating whether or not to execute data communication, whether or not to use a wireless LAN, whether or not to execute high-accuracy location using a GPS, whether or not to read personal information regarding a user, and the like, is attached to the application packages. The user refers to the access permission information and judges whether or not to actually use a particular application package, and if the application package tries to execute an operation that is not permitted in the access permission information attached to the application package, the system stops the execution. Therefore, in the case of smartphones, the access permission information attached to the application packages is saved to the terminals when the application packages are installed.

The application package 304 includes an application program, a setting file, attached data, and access permission information. An application management unit 301 manages various applications. The application management unit 301 stores the application program, the setting file, and the attached data in storage 302. The application management unit 301 stores the name of an application, the access permission information, and program storage information in a package information database (DB) 303.

Figure 3:
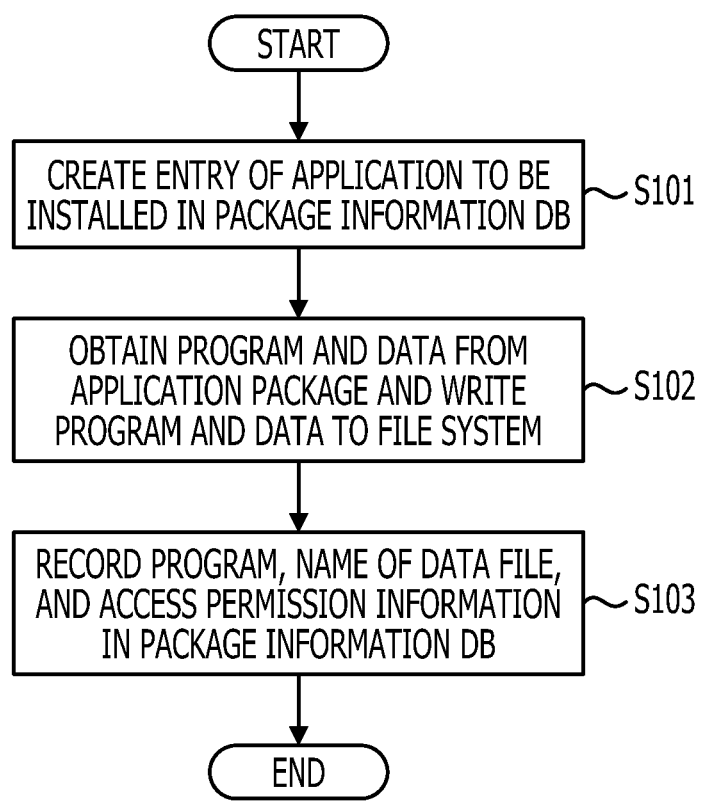
FIG. 3 is a flowchart illustrating a process for installing an application management program.

FIG. 3 is a flowchart illustrating a process for installing an application management program according to the first embodiment.

In step S101, the application management unit 301 creates an entry of an application package to be installed in the package information DB 303. The application management unit 301 then causes the process to proceed to step S102.

In step S102, the application management unit 301 obtains a program and data from the application package and writes the program and the data to a file system. The application management unit 301 then causes the process to proceed to step S103.

In step S103, the application management unit 301 records the program, the name of a data file, and access permission information. The application management unit 301 then terminates the process.

Figure 4:
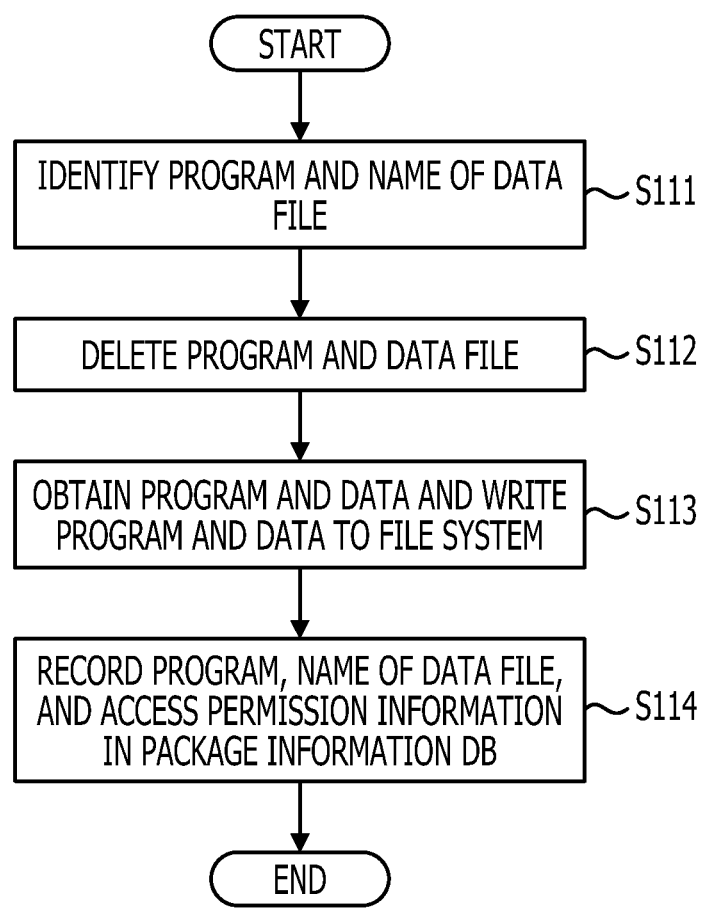
FIG. 4 is a flowchart illustrating a process for updating the application management program.

FIG. 4 is a flowchart illustrating a process for updating an application management program according to the first embodiment.

In step S111, the application management unit 301 searches the package information DB 303 using the name of an application and identifies a program and the name of a data file. The application management unit 301 then causes the process to proceed to step S112.

In step S112, the application management unit 301 deletes the program and the data file. The application management unit 301 then causes the process to proceed to step S113.

In step S113, the application management unit 301 obtains a program and data from the application package 304 and writes the program and the data to the file system. The application management unit 301 then causes the process to proceed to step S114.

In step S114, the application management unit 301 records the program, the name of the data file, and access permission information in the package information DB 303. The application management unit 301 then terminates the process.

Figure 5:
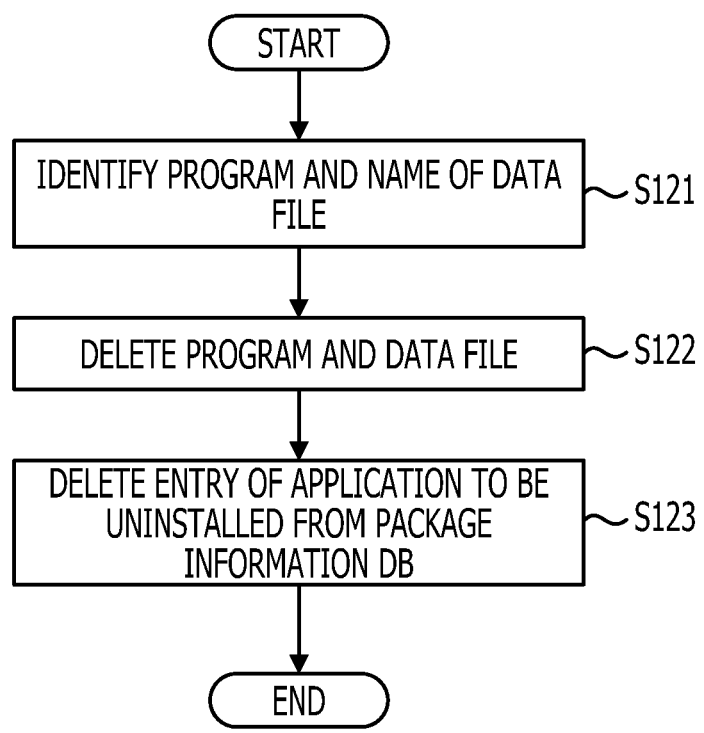
FIG. 5 is a flowchart illustrating a process for uninstalling the application management program.

FIG. 5 is a flowchart illustrating a process for uninstalling an application management program according to the first embodiment.

In step S121, the application management unit 301 searches the package information DB 303 using the name of an application and identifies a program and the name of a data file. The application management unit 301 then causes the process to proceed to step S122.

In step S122, the application management unit 301 deletes the program and the data file. The application management unit 301 then causes the process to proceed to step S123.

In step S123, the application management unit 301 deletes an entry of an application to be uninstalled from the package information DB 303. The application management unit 301 then terminates the process.

Figure 6:
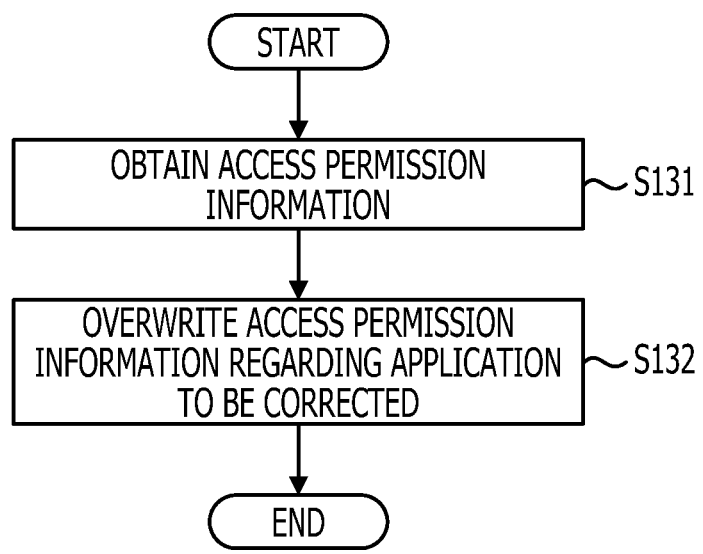
FIG. 6 is a flowchart illustrating a process for changing a right to access the application management program.

FIG. 6 is a flowchart illustrating a process for changing a right to access an application management program according to the first embodiment.

In step S131, the application management unit 301 searches the package information DB 303 using the name of an application and obtains access permission information. The application management unit 301 then causes the process to proceed to steps S132.

In step S132, the application management unit 301 overwrites the access permission information regarding an application to be corrected. The application management unit 301 then terminates the process.

In smartphones, power consumption is large when a particular peripheral device is accessed, such as when data communication is performed using a wireless device such as a wireless LAN or a 3G network or when high-accuracy location is performed using the GPS, as well as when an application executes an operation for inhibiting a terminal whose LCD has been turned off from entering a sleep mode. There is already access permission information corresponding to these operations that cause power consumption to increase.

By reading access permission information regarding all applications that have been installed on a smartphone, it is possible without executing applications to judge whether or not the individual applications execute any of the operations that cause power consumption to increase, and, if any of the operations is executed, to identify which operation is executed.

A terminal manufacturer judges how much power a certain peripheral device consumes and how much power a CPU consumes when a terminal continues to operate without sleeping. The relationship between the amounts of power consumption when these operations are performed remains the same regardless of the types of terminals. Therefore, a third party (for example, a developer of an application that terminates itself in accordance with the remaining amount of electric charge of a battery) other than the terminal manufacturer also provides this information.

In the first embodiment, by referring to the above-described two types of information, a group of applications created on the basis of the operations that cause power consumption to increase is arranged in order of the amount of power consumption.

FIG. 7 illustrates a class/application type correspondence table 510. The class/application type correspondence table 510 includes class names 511 and application types 512. In the class/application type correspondence table 510, the types of applications to be terminated when the battery level decreases are classified.

In the first embodiment, applications are classified in accordance with the amounts of power consumption when the CPU 201 has executed the applications. It is seen from the class/application type correspondence table 510 that power consumed by the CPU 201 to execute an application "use of GPS" or "reproduction of music" is larger than power consumed by the CPU 201 to execute an application "data communication". When the applications "use of GPS", "reproduction of music", and "data communication" are being executed at the same time, the applications "use of GPS" and "reproduction of music" are to be terminated prior to the application "data communication".

FIG. 8 illustrates an application type/access permission information correspondence table 520. The application type/access permission information correspondence table 520 includes application types 512 and access permission information 522. The access permission information 522 indicates operations in which applications cause power consumption to increase. In the application type/access permission information correspondence table 520, values of the access permission information included in applications to be terminated and the types of applications are associated with each other.

FIG. 9 illustrates a forced termination target exception list 540. The forced termination target exception list 540 includes change possibility 531 and an application name list 532. The forced termination target exception list 540 indicates applications to be excluded from the target of a forced termination process. The change possibility 531 includes "change impossible" provided by the system and "change possible" that is specified by the user. The application name list 532 indicates the names of applications.

In the first embodiment, an application "telephone" is not the target of forced termination. The user adds, to "change possible", an application that the user does not wish to be a target of forced termination.

FIG. 10 illustrates a forced termination target application list 530. The forced termination target application list 530 includes class names 511 and application names 542. By referring to the tables illustrated in FIGS. 7 to 9 and the access permission information regarding all the applications that have been installed, a forced termination target application list maintenance unit 305 generates the forced termination target application list 530. The forced termination target application list 530 illustrated in FIG. 10 indicates that applications "navigation" and "music" are to be terminated prior to an application "browser".

Figure 11:
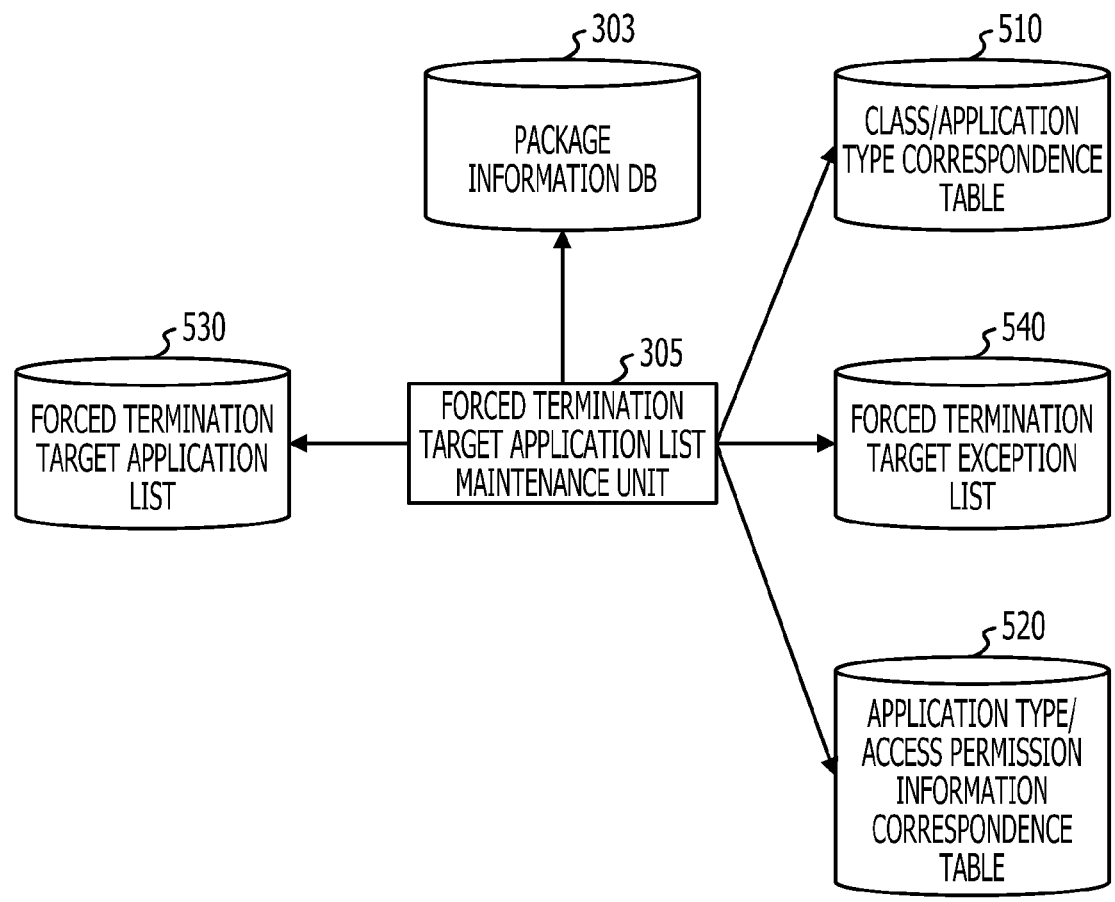
FIG. 11 is a diagram illustrating the flow of data when the forced termination target application list is created.

FIG. 11 is a functional block diagram illustrating the information processing apparatus 100 illustrated in FIG. 1. The information processing apparatus 100 includes the forced termination target application list maintenance unit 305, the package information DB 303, the class/application type correspondence table 510, the forced termination target exception list 540, the application type/access permission information correspondence table 520, and the forced termination target application list 530. As described above, by referring to the tables illustrated in FIGS. 7 to 9 and the access permission information regarding all the applications that have been installed, the forced termination target application list maintenance unit 305 executes a procedure for processing a list to generate the forced termination target application list 530.

Figure 12:
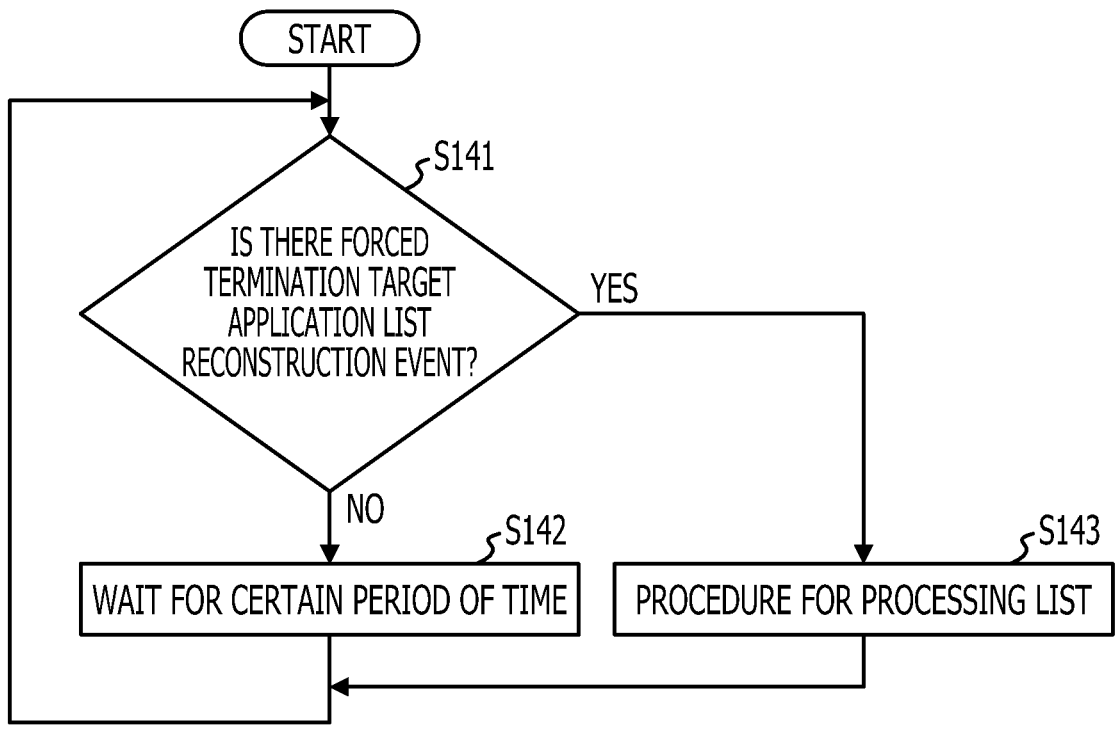
FIG. 12 is a flowchart illustrating a process executed by a forced termination target application list maintenance unit.

FIG. 12 is a flowchart illustrating a process executed by the forced termination target application list maintenance unit 305.

In step S141, the forced termination target application list maintenance unit 305 judges whether or not there is a forced termination target application list reconstruction event. If there is a forced termination target application list reconstruction event, the forced termination target application list maintenance unit 305 causes the process to proceed to step S143. On the other hand, if there is no forced termination target application list reconstruction event, the forced termination target application list maintenance unit 305 causes the process to proceed to step S142.

In step S142, the forced termination target application list maintenance unit 305 waits for a certain period of time, and then returns the process to step S141.

In step S143, the forced termination target application list maintenance unit 305 executes the procedure for processing a list. The forced termination target application list maintenance unit 305 then returns the process to step S141.

Figure 13:
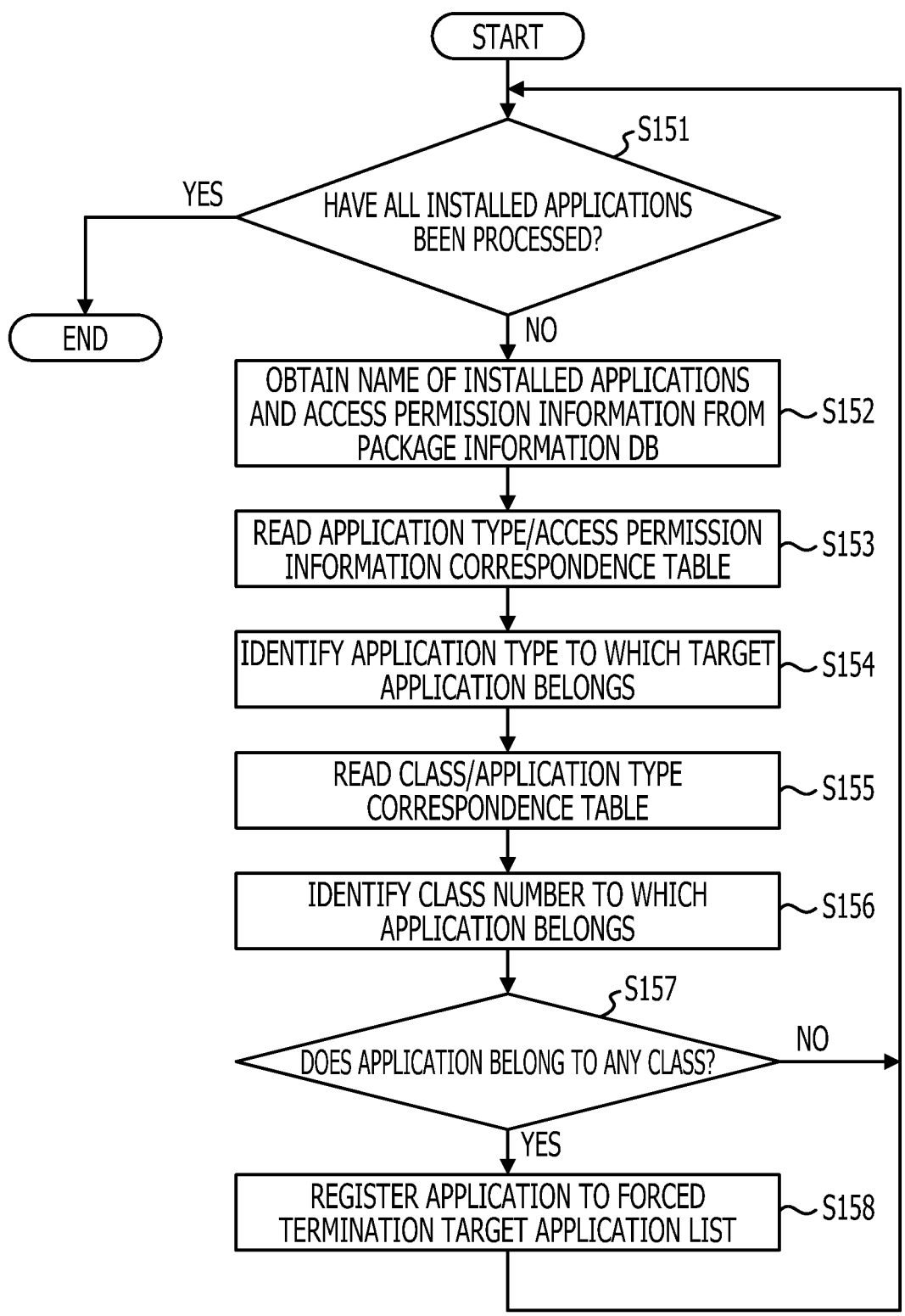
FIG. 13 is a flowchart illustrating a procedure for processing a list executed by the forced termination target application list maintenance unit.

FIG. 13 is a flowchart illustrating the procedure for processing a list executed by the forced termination target application list maintenance unit 305.

In step S151, the forced termination target application list maintenance unit 305 judges whether or not all the applications that have been installed have been processed. If all the applications that have been installed have been processed, the forced termination target application list maintenance unit 305 terminates the process. On the other hand, if not all the applications that have been installed have been processed, the forced termination target application list maintenance unit 305 causes the process to proceed to step S152.

In step S152, the forced termination target application list maintenance unit 305 obtains the names of applications that have been installed and the access permission information from the package information DB 303. The forced termination target application list maintenance unit 305 then causes the process to proceed to steps S153.

In step S153, the forced termination target application list maintenance unit 305 reads the application type/access permission information correspondence table 520. The forced termination target application list maintenance unit 305 then causes the process to proceed to step S154.

In step S154, the forced termination target application list maintenance unit 305 identifies the type of application to which a target application belongs. The forced termination target application list maintenance unit 305 then causes the process to proceed to step S155.

In step S155, the forced termination target application list maintenance unit 305 reads the class/application type correspondence table 510. The forced termination target application list maintenance unit 305 then causes the process to proceed to step S156.

In step S156, the forced termination target application list maintenance unit 305 identifies a class number to which the application belongs. The forced termination target application list maintenance unit 305 then causes the process to proceed to step S157.

In step S157, the forced termination target application list maintenance unit 305 judges whether or not the application belongs to any class. If the application belongs to any class, the forced termination target application list maintenance unit 305 causes the process to proceed to step S158. On the other hand, if the application does not belong to any class, the forced termination target application list maintenance unit 305 returns the process to step S151.

In step S158, the forced termination target application list maintenance unit 305 registers the application to the forced termination target application list 530. The forced termination target application list maintenance unit 305 then returns the process to step S151.

Figure 14:
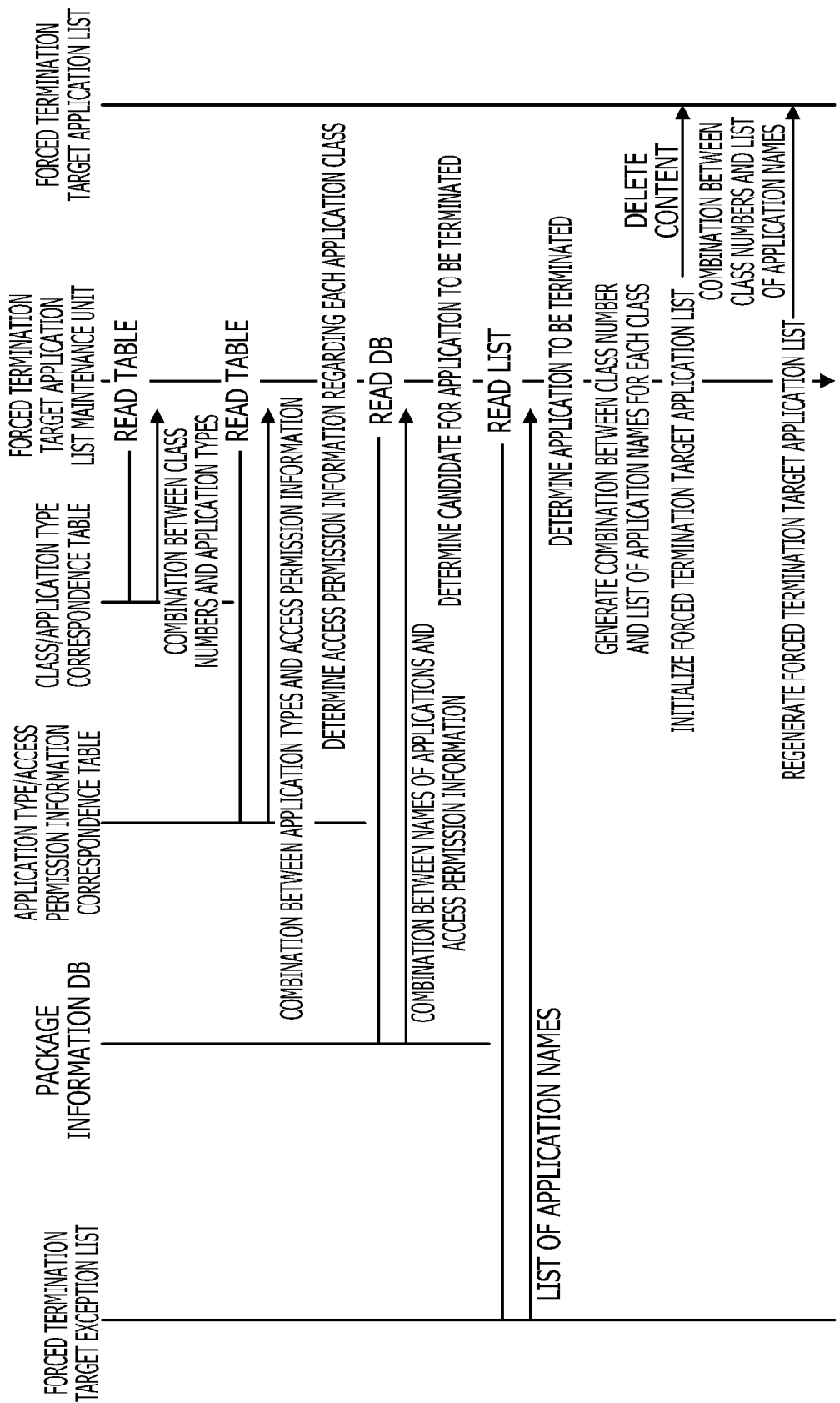
FIG. 14 is a timing chart illustrating the creation of the forced termination target application list.

FIG. 14 is a timing chart illustrating the creation of the forced termination target application list 530.

By referring to the forced termination target application list 530 created by the above process and the list of applications operating in the background obtained from an application judgment unit 308, an application control unit 306 instructs an OS 307 to execute forced termination. A battery remaining amount monitoring unit 310 monitors the remaining amount of electric charge of the battery. With respect to the timing of generation of an event, the battery remaining amount monitoring unit 310 notifies the application control unit 306 of the name of the class of an application to be terminated when the remaining amount of electric charge of the battery has decreased to a certain threshold.

FIG. 15 illustrates a battery remaining amount/class correspondence table 550. The battery remaining amount/class correspondence table 550 includes class names 511 and battery remaining amounts 552. The battery remaining amounts 552 indicate the remaining amounts of electric charge of the battery in the information processing apparatus 100.

The battery remaining amount/class correspondence table 550 indicates that when the remaining amount of electric charge of the battery in the information processing apparatus 100 has become 50%, the applications "navigation" and "music" associated with a class name of 1 become the targets of forced termination. When the remaining amount of electric charge of the battery in the information processing apparatus 100 has decreased to a certain threshold, the battery remaining amount monitoring unit 310 refers to the battery remaining amount/class correspondence table 550 and notifies the application control unit 306 of the class name of an application to be terminated. The application control unit 306 instructs the OS 307 to execute forced termination by referring to the forced termination target application list 530 and the list of applications operating in the background obtained from the application judgment unit 308. The OS 307 terminates the application to be terminated on the basis of the instruction issued from the application control unit 306.

Figure 16:
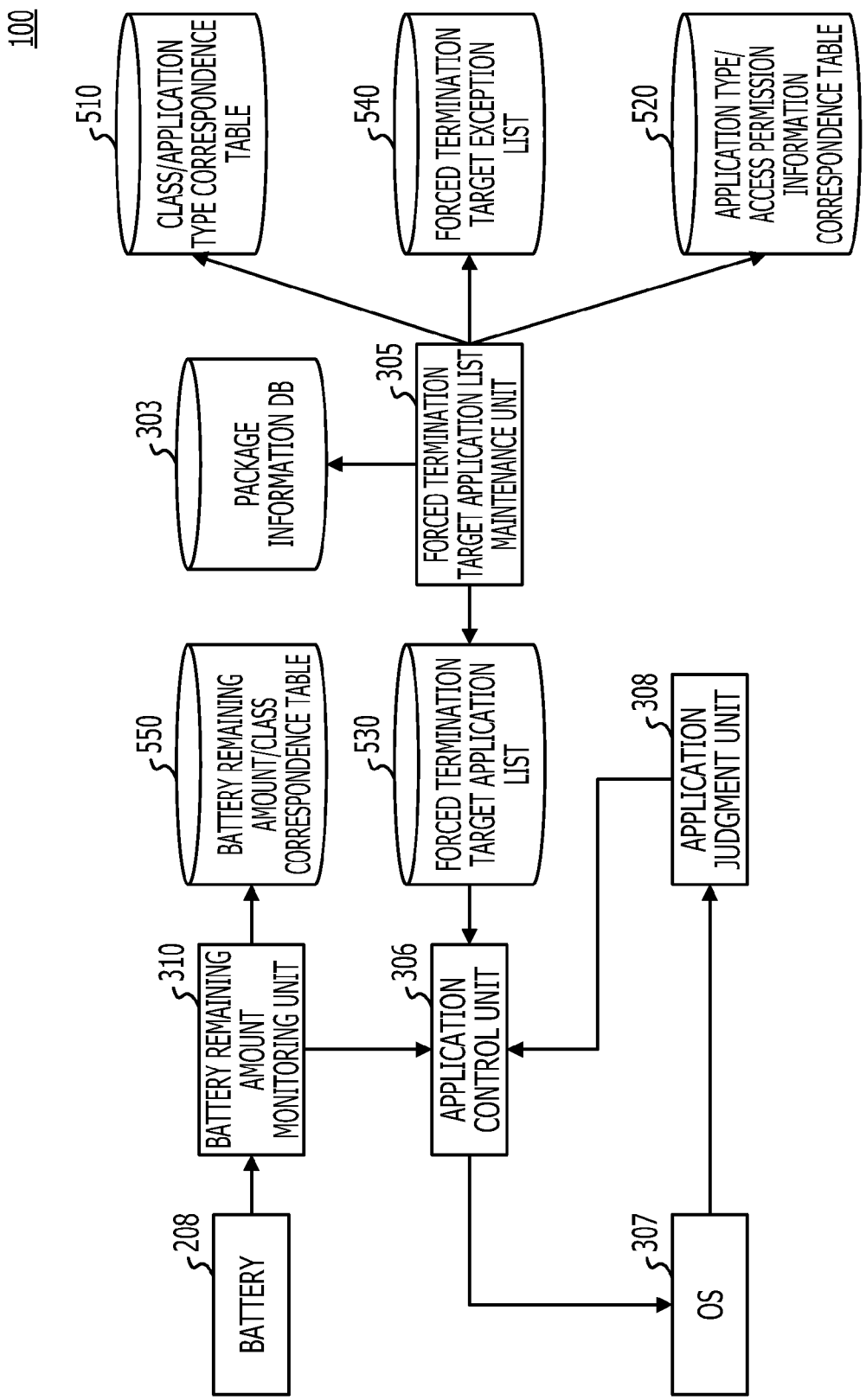
FIG. 16 is a diagram illustrating an application forced termination system according to the remaining amount of electric charge of a battery.

FIG. 16 is a functional block diagram illustrating the information processing apparatus 100 illustrated in FIG. 1. The information processing apparatus 100 includes the forced termination target application list maintenance unit 305, the package information DB 303, the class/application type correspondence table 510, the forced termination target exception list 540, the application type/access permission information correspondence table 520, the forced termination target application list 530, the application control unit 306, the OS 307, the application judgment unit 308, the battery 208, the battery remaining amount monitoring unit 310, and the battery remaining amount/class correspondence table 550. The components that have been described with reference to FIG. 11 are given the same reference numerals, and therefore description thereof is omitted.

The application judgment unit 308 obtains the list of applications operating in the background and transmits the list to the application control unit 306. The battery remaining amount monitoring unit 310 monitors the remaining amount of electric charge of the battery 208. The application control unit 306 refers to the forced termination target application list 530 generated by the above-described process and the list of applications operating in the background transmitted from the application judgment unit 308. If there is the name of an application operating in the background in the forced termination target application list 530, the application control unit 306 instructs the OS 307 to execute forced termination to terminate the application. The OS 307 terminates the application on the basis of the instruction issued from the application control unit 306.

Figure 17:
FIG. 17 is a timing chart illustrating forced termination of an application according to the remaining amount of electric charge of the battery.

FIG. 17 is a timing chart illustrating forced termination of an application according to the remaining amount of electric charge of the battery 208.

Figure 18:
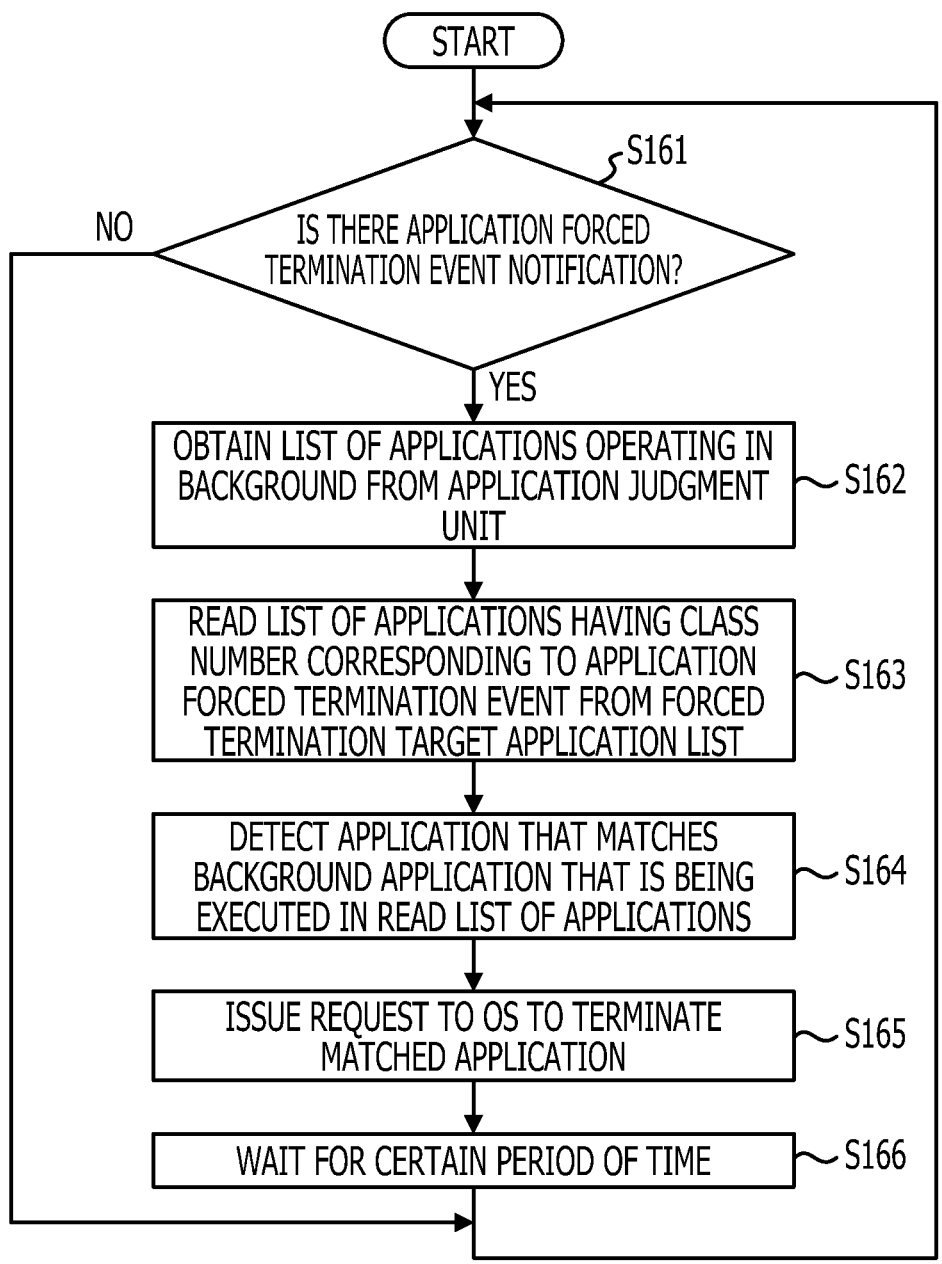
FIG. 18 is a flowchart illustrating a process executed by an application control unit.

FIG. 18 illustrates a process executed by the application control unit 306.

In step S161, the application control unit 306 judges whether or not an application forced termination event notification has been received from the battery remaining amount monitoring unit 310. If an application forced termination event notification has been received, the application control unit 306 causes the process to proceed to step S162. On the other hand, if an application forced termination event notification has not been received, the application control unit 306 repeats the processing in step S161.

In step S162, the application control unit 306 obtains the list of applications operating in the background from the application judgment unit 308. The application control unit 306 then causes the process to proceed to step S163.

In step S163, the application control unit 306 reads a list of applications having a class number corresponding to the application forced termination event from the forced termination target application list 530. The application control unit 306 then causes the process to proceed to step S164.

In step S164, the application control unit 306 detects an application that matches an application operating in the background in the read application list. The application control unit 306 then causes the process to proceed to step S165.

In step S165, the application control unit 306 instructs the OS 307 to terminate the matched application as a target. The application control unit 306 then causes the process to proceed to step S166.

In step S166, the application control unit 306 waits for a certain period of time. The application control unit 306 then returns the process to step S161.

Figure 19:
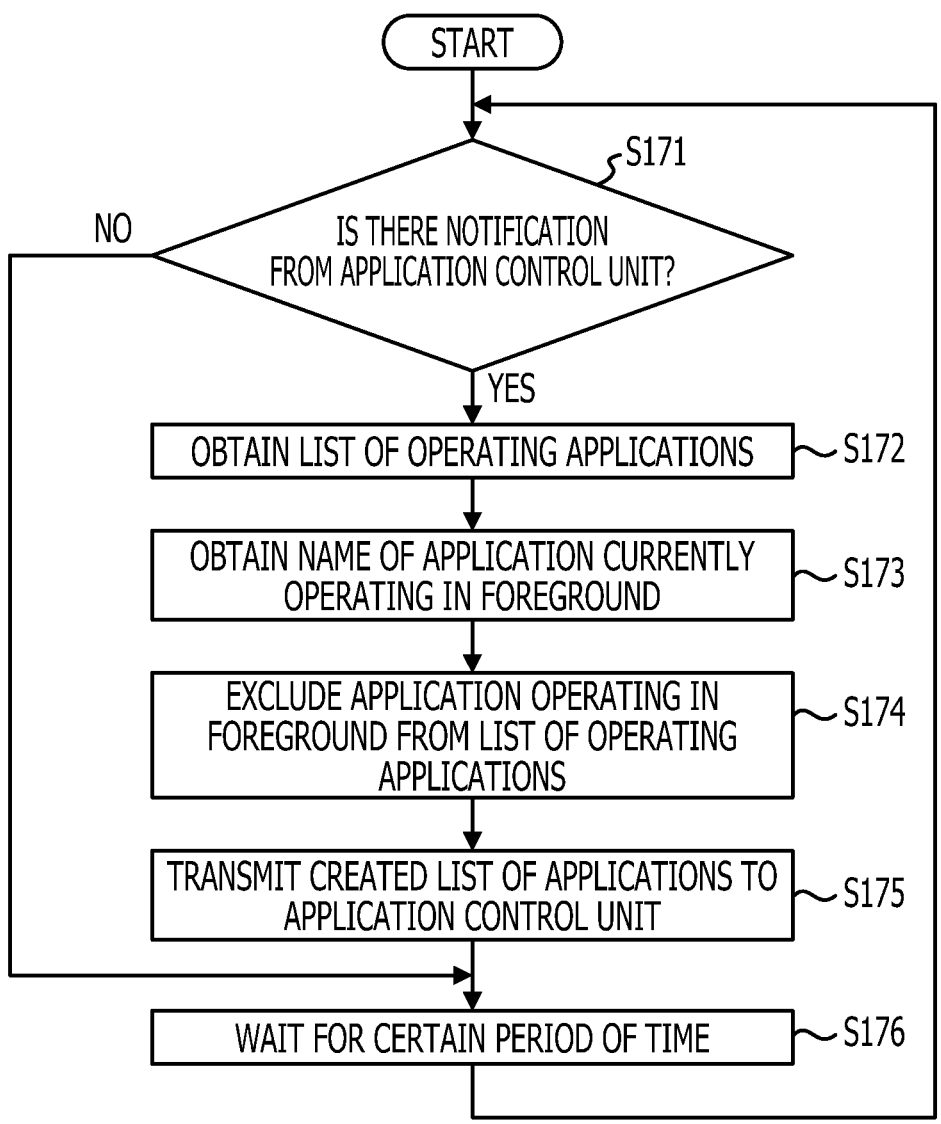
FIG. 19 is a flowchart illustrating a process executed by an application judgment unit.

FIG. 19 illustrates a process executed by the application judgment unit 308.

In step S171, the application judgment unit 308 judges whether or not a notification has been received from the application control unit 306. If a notification has been received from the application control unit 306, the application judgment unit 308 causes the process to proceed to step S172. On the other hand, if a notification has not been received from the application control unit 306, the application judgment unit 308 causes the process to proceed to step S176.

In step S172, the application judgment unit 308 obtains the list of operating applications. The application judgment unit 308 then causes the process to proceed to step S173.

In step S173, the application judgment unit 308 obtains the names of applications currently operating in the foreground. The application judgment unit 308 then causes the process to proceed to step S174.

In step S174, the application judgment unit 308 excludes the applications operating in the foreground from the list of operating applications. The application judgment unit 308 then causes the process to proceed to step S175.

In step S175, the application judgment unit 308 notifies the created list of applications to the application control unit 306. The application judgment unit 308 then causes the process to proceed to step S176.

In step S176, the application judgment unit 308 waits for a certain period of time. The application judgment unit 308 then returns the process to step S171.

Figure 20:
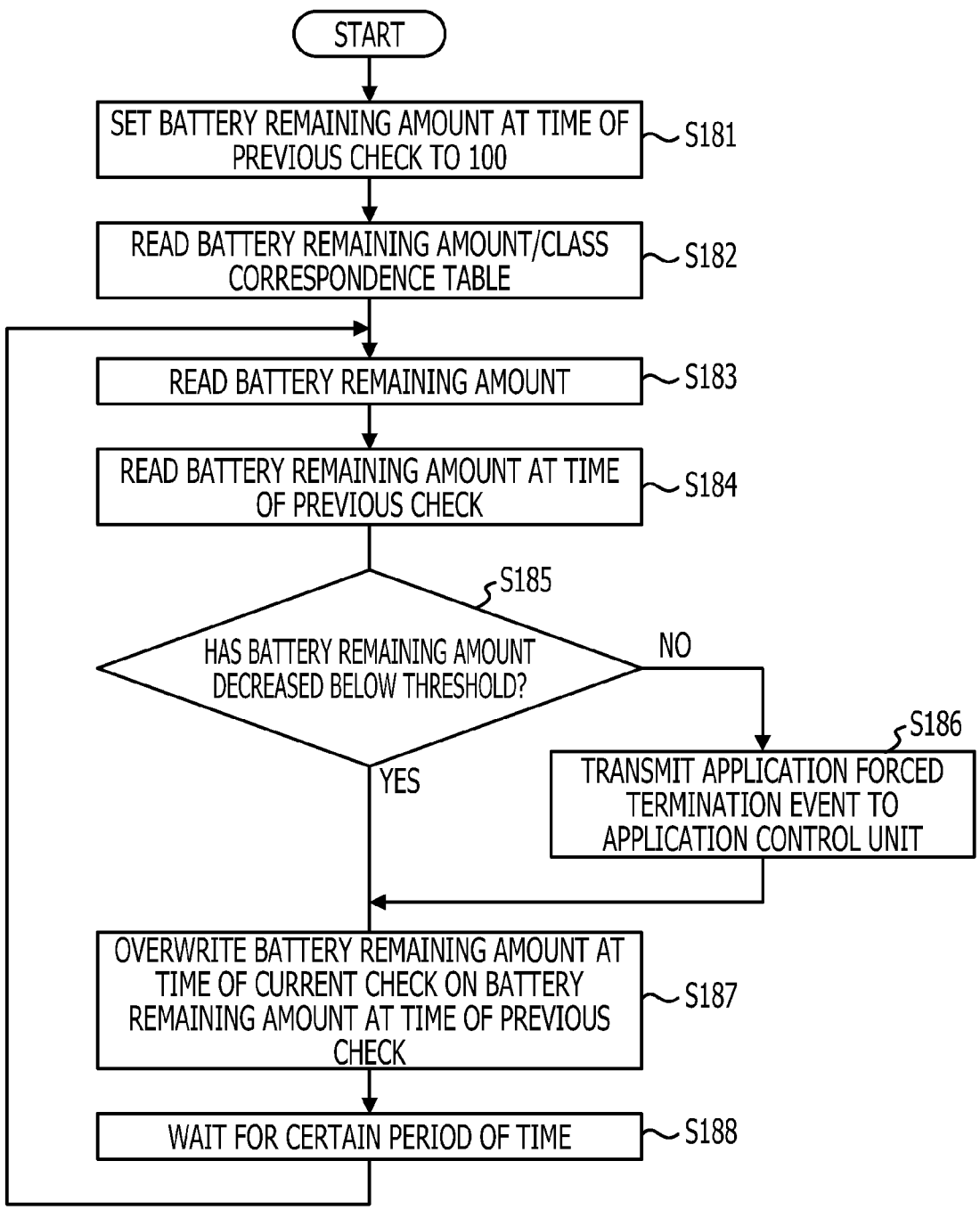
FIG. 20 is a flowchart illustrating a process executed by a battery remaining amount monitoring unit.

FIG. 20 illustrates a process executed by the battery remaining amount monitoring unit 310.

In step S181, the battery remaining amount monitoring unit 310 sets the remaining amount of electric charge of the battery 208 at the time of the previous check to 100. The battery remaining amount monitoring unit 310 then causes the process to proceed to step S182.

In step S182, the battery remaining amount monitoring unit 310 reads the battery remaining amount/class correspondence table 550. The battery remaining amount monitoring unit 310 then causes the process to proceed to step S183.

In step S183, the battery remaining amount monitoring unit 310 reads the remaining amount of electric charge of the battery 208. The battery remaining amount monitoring unit 310 then causes the process to proceed to step S184.

In step S184, the battery remaining amount monitoring unit 310 reads the remaining amount of electric charge of the battery 208 at the time of the previous check. The battery remaining amount monitoring unit 310 then causes the process to proceed to step S185.

In step S185, the battery remaining amount monitoring unit 310 judges whether or not the remaining amount of electric charge of the battery 208 has decreased below the threshold. If the remaining amount of electric charge of the battery 208 has decreased below the threshold, the battery remaining amount monitoring unit 310 causes the process to proceed to step S187. On the other hand, if the remaining amount of electric charge of the battery 208 has not decreased below the threshold, the battery remaining amount monitoring unit 310 causes the process to proceed to step S186.

In step S186, the battery remaining amount monitoring unit 310 notifies the application control unit 306 of an application forced termination event. The battery remaining amount monitoring unit 310 then causes the process to proceed to step S187.

In step S187, the battery remaining amount monitoring unit 310 overwrites the remaining amount of electric charge of the battery 208 at the time of the current check on the remaining amount of electric charge of the battery 208 at the time of the previous check. The battery remaining amount monitoring unit 310 then causes the process to proceed to step S188.

In step S188, the battery remaining amount monitoring unit 310 waits for a certain period of time. The battery remaining amount monitoring unit 310 then returns the process to step S183.

According to the first embodiment, by utilizing the access permission information used for security purposes, it is possible to classify applications into groups without correcting the existing applications or OSs, analyzing the operation of the applications, or measuring the power consumption. By terminating, when the remaining amount of electric charge of a battery has decreased, operating applications that belong to a group of applications whose power consumption is large in accordance with this classification, it is possible to increase the life of the battery in a terminal.

In a second embodiment, a timer is used for events. The timer is registered to a core (kernel) of an OS or the like, so that events are generated at certain intervals, and the access permission information regarding all the applications that have been installed is analyzed when an event is generated, thereby completely revising the tables.

Figure 21:
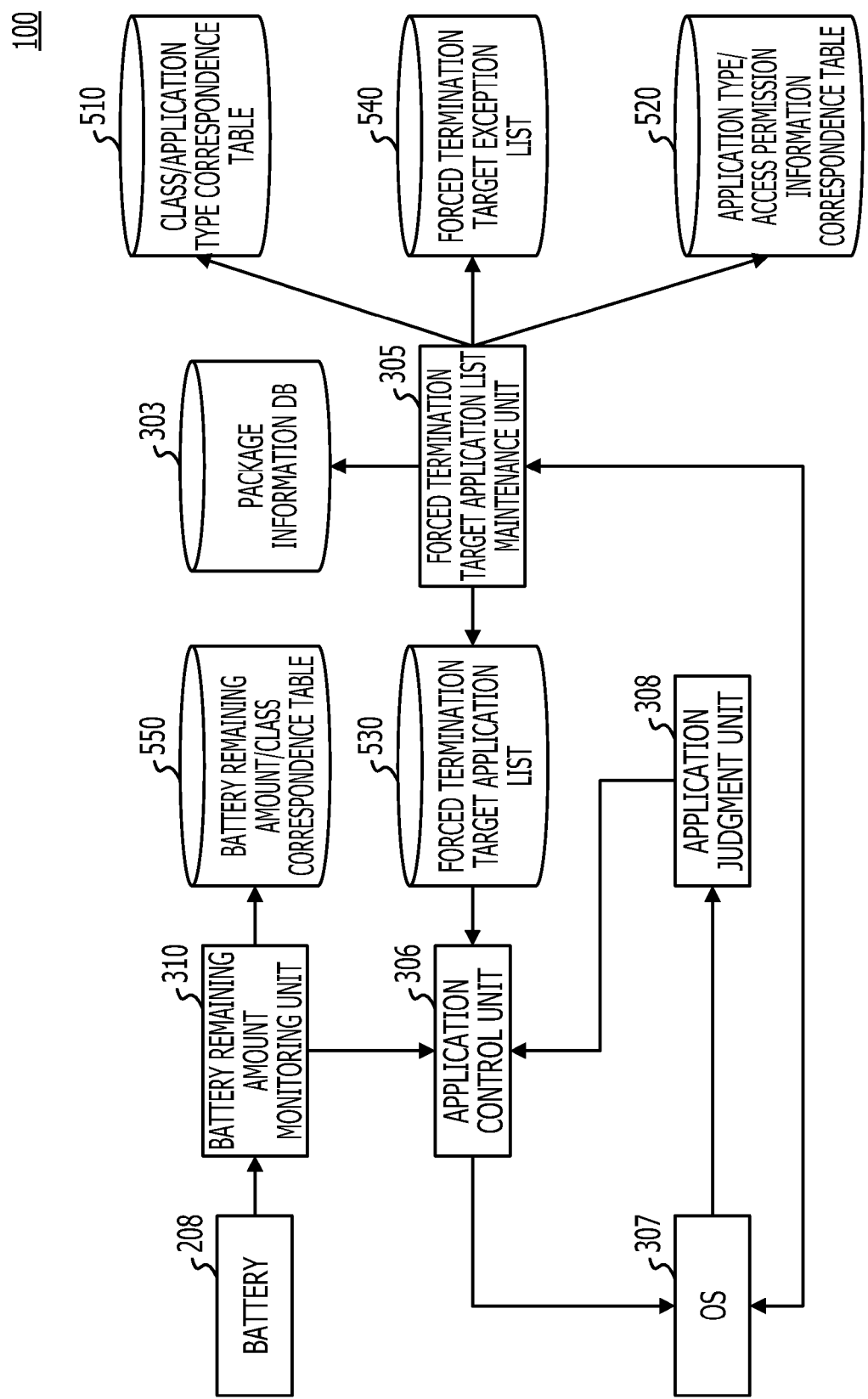
FIG. 21 is a diagram illustrating the configuration of a system according to a first embodiment.

FIG. 21 illustrates a functional block diagram illustrating the information processing apparatus 100 illustrated in FIG. 1. Since the function of each block has been described above, description thereof is omitted.

Figure 22:
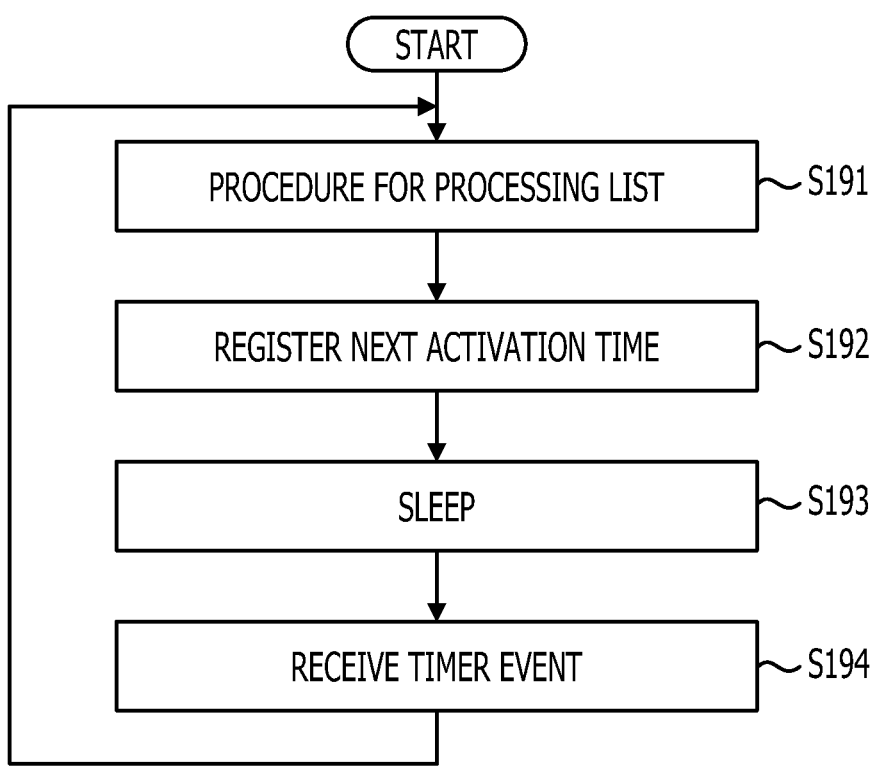
FIG. 22 is a flowchart illustrating a process executed by the forced termination target application list maintenance unit.

FIG. 22 illustrates a process executed by the forced termination target application list maintenance unit 305.

In step S191, the forced termination target application list maintenance unit 305 executes a procedure for processing a list. The forced termination target application list maintenance unit 305 then causes the process to proceed to step S192.

In step S192, the forced termination target application list maintenance unit 305 registers a next activation time. The forced termination target application list maintenance unit 305 then causes the process to proceed to step S193.

In step S193, the forced termination target application list maintenance unit 305 sleeps. The forced termination target application list maintenance unit 305 then causes the process to proceed to step S194.

In step S194, the forced termination target application list maintenance unit 305 receives a timer event. The forced termination target application list maintenance unit 305 then returns the process to step S191, and executes the procedure for processing a list again.

In a third embodiment, a function of generating an event is added to an installer used for maintenance of applications. Events for reconstructing the tables are generated after maintenance operations such as installation of a new application, updating of an existing application, and uninstallation of an existing application. Next, upon receiving an event, a table construction unit reads the access permission information regarding all the applications that have been installed, thereby completely revising the tables.

Figure 23:
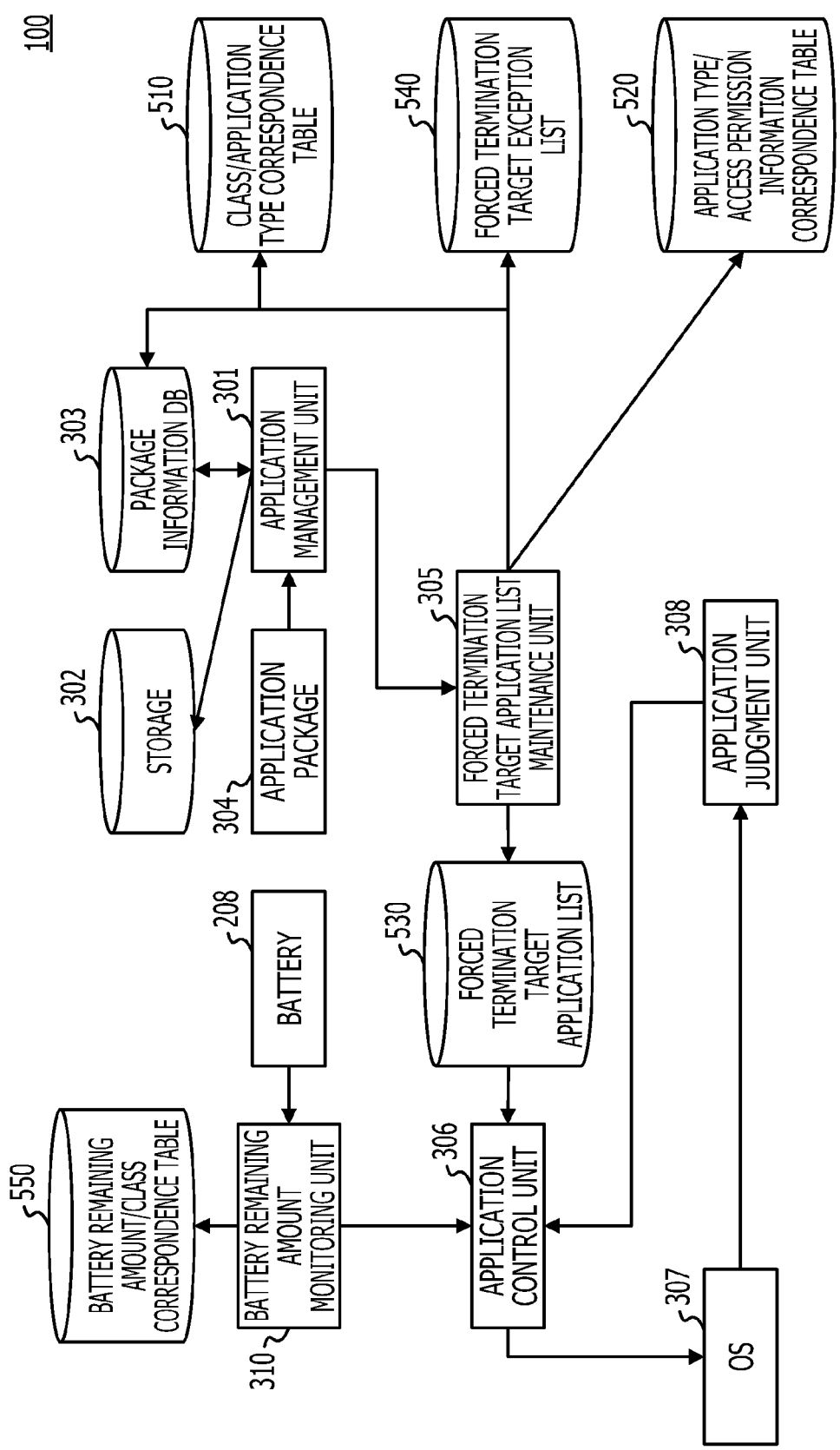
FIG. 23 is a diagram illustrating the configuration of a system according to a second embodiment.

FIG. 23 is a functional block diagram illustrating the information processing apparatus 100 illustrated in FIG. 1. Since the function of each block has been described above, description thereof is omitted.

Figure 24:
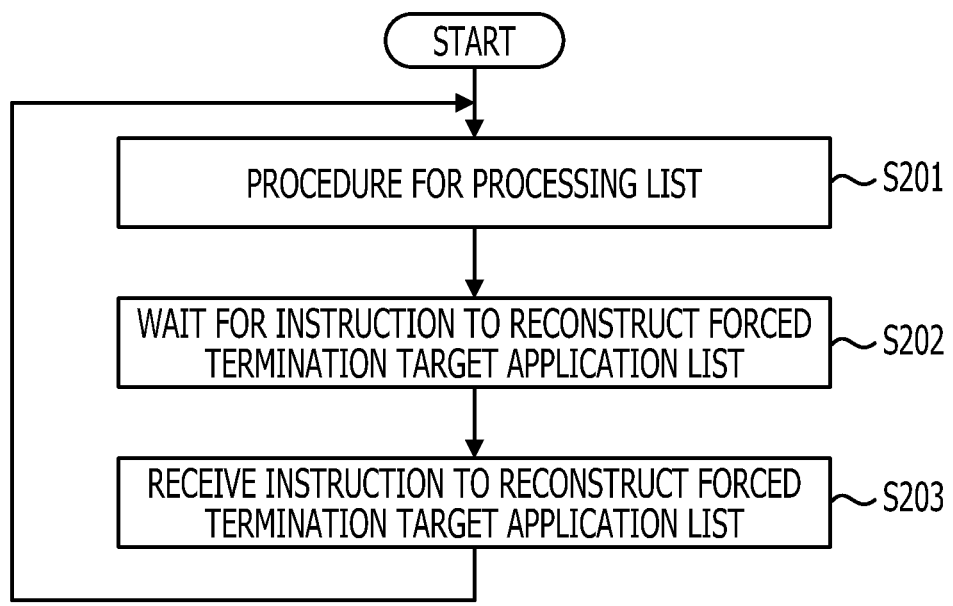
FIG. 24 is a flowchart illustrating a process executed by the forced termination target application list maintenance unit.

FIG. 24 illustrates a process executed by the forced termination target application list maintenance unit 305.

In step S201, the forced termination target application list maintenance unit 305 executes a procedure for processing a list. The forced termination target application list maintenance unit 305 then causes the process to proceed to step S202.

In step S202, the forced termination target application list maintenance unit 305 waits for an instruction to reconstruct the forced termination target application list from the application management unit 301. The forced termination target application list maintenance unit 305 then causes the process to proceed to step S203.

In step S203, the forced termination target application list maintenance unit 305 receives the instruction to reconstruct the forced termination target application list from the application management unit 301. The forced termination target application list maintenance unit 305 returns the process to step S201, and executes the procedure for processing a list again.

Figure 25:
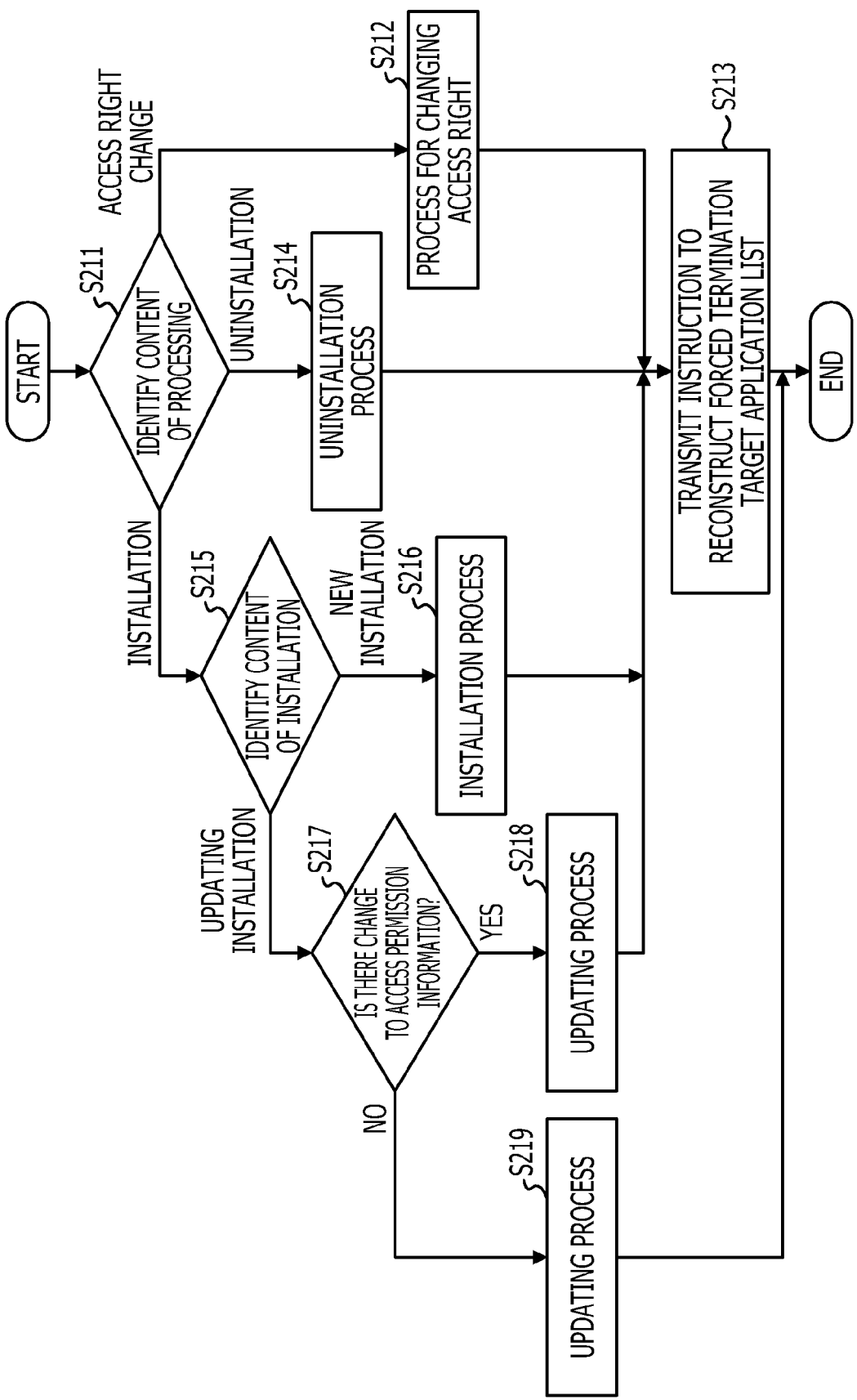
FIG. 25 is a flowchart illustrating a process executed by the application management program.

FIG. 25 illustrates a process executed by the application management program.

In step S211, the application management unit 301 identifies the content of processing. If the content of processing is a change to the access right, the application management unit 301 causes the process to proceed to step S212. If the content of processing is uninstallation, the application management unit 301 causes the process to proceed to step S214. If the content of processing is installation, the application management unit 301 causes the process to proceed to step S215.

In step S212, the application management unit 301 executes a process for changing the access right. The application management unit 301 then causes the process to proceed to step S213.

In step S214, the application management unit 301 executes an uninstallation process. The application management unit 301 then causes the process to proceed to step S213.

In step S215, the application management unit 301 identifies the content of the installation. If the content of the installation is new installation, the application management unit 301 causes the process to proceed to step S216. On the other hand, if the content of the installation is updating installation, the application management unit 301 causes the process to proceed to step S217.

In step S216, the application management unit 301 executes an installation process. The application management unit 301 then causes the process to proceed to step S213.

In step S217, the application management unit 301 judges whether or not there is a change to the access permission information. If there is a change to the access permission information, the application management unit 301 causes the process to proceed to step S218. On the other hand, if there is no change to the access permission information, the application management unit 301 causes the process to proceed to step S219.

In step S218, the application management unit 301 executes an updating process. The application management unit 301 then causes the process to proceed to step S213.

In step S219, the application management unit 301 executes an updating process. The application management unit 301 then terminates the process.

In step S213, the application management unit 301 transmits an instruction to reconstruct the forced termination target application list to the forced termination target application list maintenance unit 305. The application management unit 301 then terminates the process.

In a fourth embodiment, the function of the forced termination target application list maintenance unit 305 is integrated into the installer. Instead of generating an event according to the third embodiment, a range of the tables in which the tables are affected by maintenance operations is detected and corrected during the maintenance operations for the applications.

Figure 26:
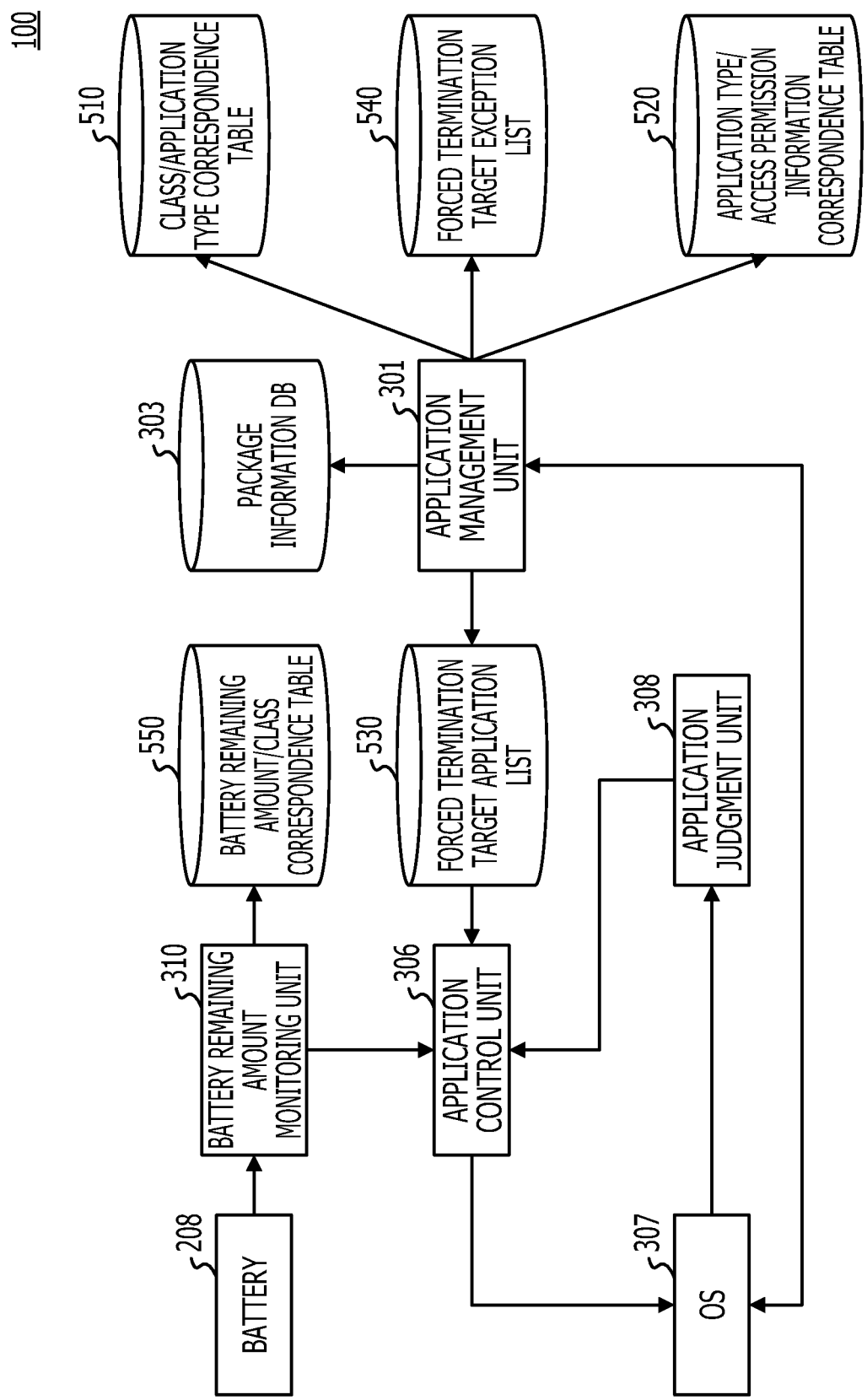
FIG. 26 is a diagram illustrating the configuration of a system according to a third embodiment.

FIG. 26 is a functional block diagram illustrating the information processing apparatus 100 illustrated in FIG. 1. Since the function of each block has been described above, description thereof is omitted.

Figure 27:
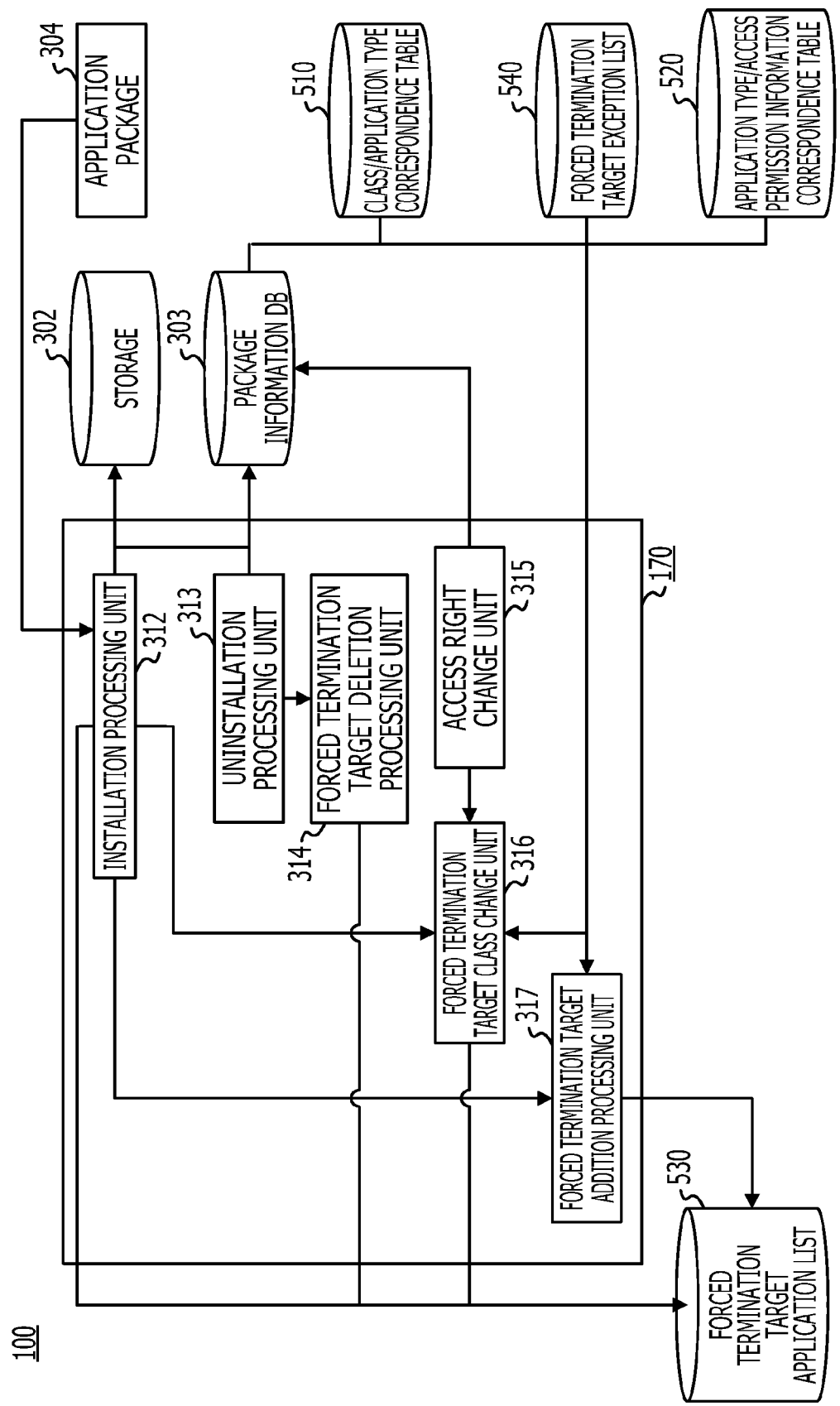
FIG. 27 is a diagram illustrating the inner structure of the application management program.

FIG. 27 is a diagram illustrating the configuration of an application management program according to the fourth embodiment. An application management program 170 includes an installation processing unit 312, an uninstallation processing unit 313, a forced termination target deletion processing unit 314, an access right change unit 315, a forced termination target class change unit 316, and a forced termination target addition processing unit 317. The installation processing unit 312 executes the installation process. The uninstallation processing unit 313 executes the uninstallation process. The forced termination target deletion processing unit 314 deletes the name of an application that has become a target of forced termination in the forced termination target application list 530. The access right change unit 315 changes the access right. The forced termination target class change unit 316 changes the class of an application that has become a target of forced termination in the forced termination target application list 530. The forced termination target addition processing unit 317 adds the name of an application that has newly become a target of forced termination to the forced termination target application list 530.

Figure 28:
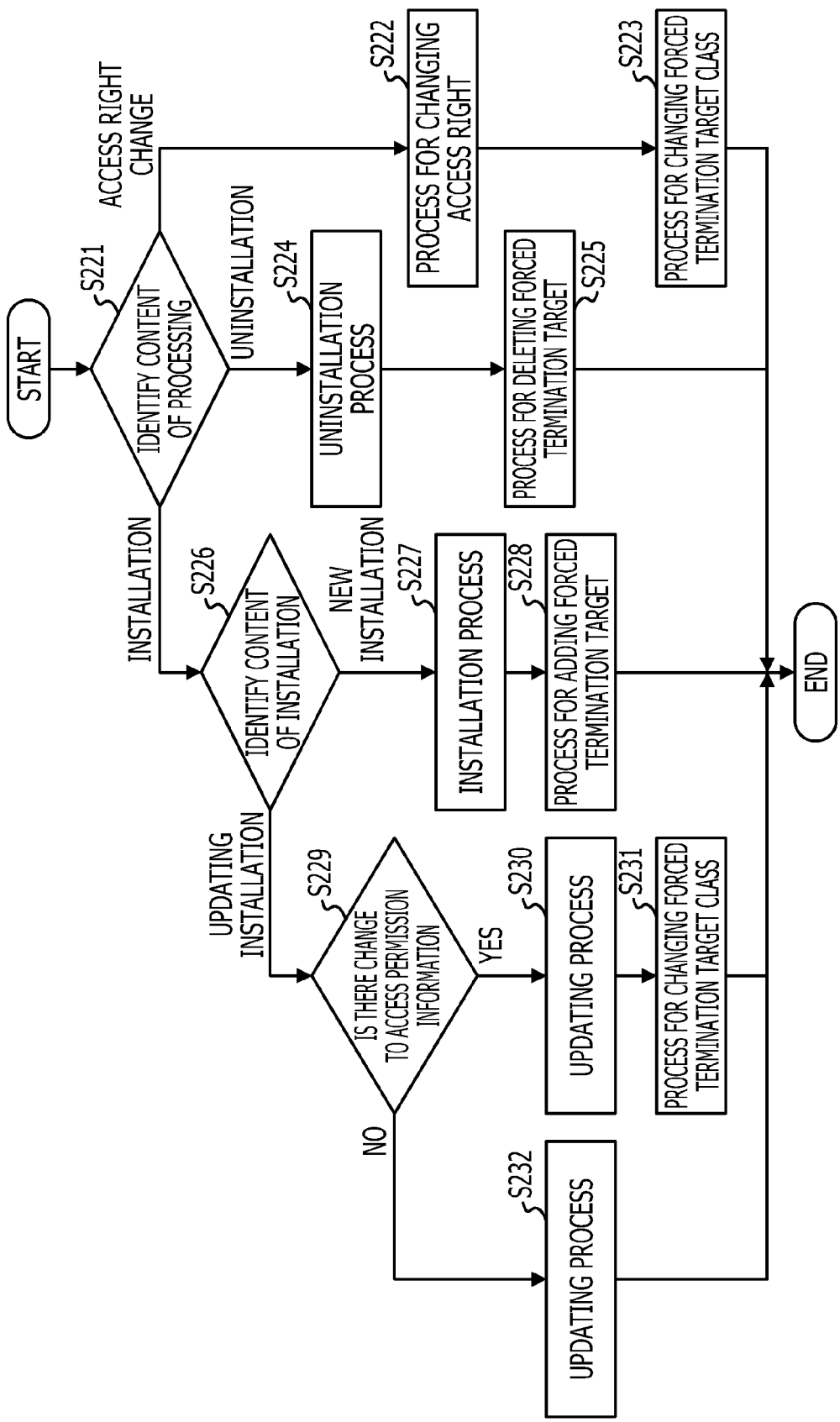
FIG. 28 is a flowchart illustrating a process executed by the application management program.

FIG. 28 illustrates a process executed by the application management program.

In step S221, the application management unit 301 identifies the content of processing. If the content of processing is a change to the access right, the application management unit 301 causes the process to proceed to step S222. If the content of processing is uninstallation, the application management unit 301 causes the process to proceed to step S224. If the content of processing is installation, the application management unit 301 causes the process to proceed to step S226.

In step S222, the application management unit 301 executes a process for changing the access right. The application management unit 301 then causes the process to proceed to step S223.

In step S223, the application management unit 301 executes a process for changing a forced termination target class. The application management unit 301 then terminates the process.

In step S224, the application management unit 301 executes an uninstallation process. The application management unit 301 then causes the process to proceed to step S225.

In step S225, the application management unit 301 executes a process for deleting a forced termination target. The application management unit 301 then terminates the process.

In step S226, the application management unit 301 identifies the content of the installation. If the content of the installation is new installation, the application management unit 301 causes the process to proceed to step S227. On the other hand, if the content of the installation is updating installation, the application management unit 301 causes the process to proceed to step S229.

In step S227, the application management unit 301 executes an installation process. The application management unit 301 then causes the process to proceed to step S228.

In step S228, the application management unit 301 executes a process for adding a forced termination target. The application management unit 301 then terminates the process.

In step S229, the application management unit 301 judges whether or not there is a change to the access permission information. If there is a change to the access permission information, the application management unit 301 causes the process to proceed to step S230. On the other hand, if there is no change to the access permission information, the application management unit 301 causes the process to proceed to step S232.

In step S230, the application management unit 301 executes an updating process. The application management unit 301 then causes the process to proceed to step S231.

In step S231, the application management unit 301 executes a process for changing a forced termination target class. The application management unit 301 then terminates the process.

In step S232, the application management unit 301 executes an updating process. The application management unit 301 then terminates the process.

Figure 29:
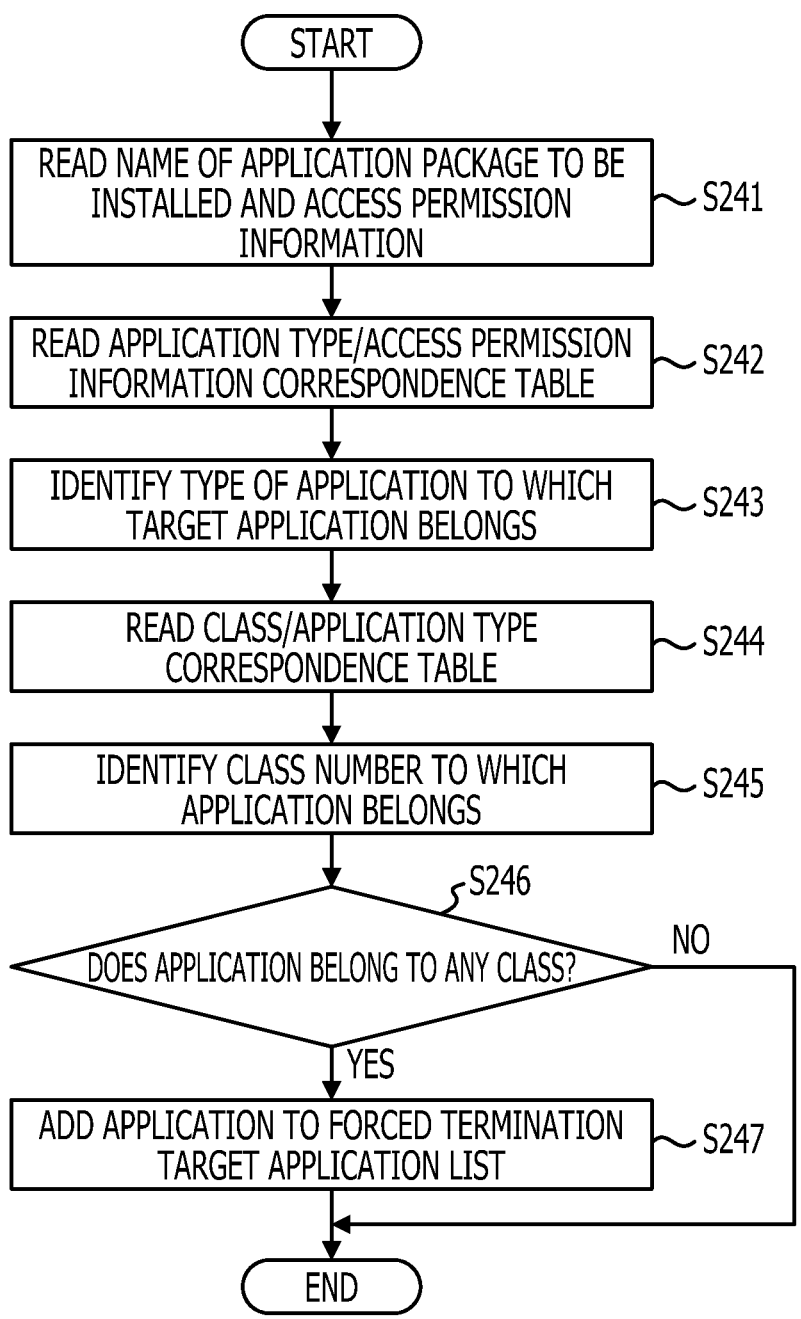
FIG. 29 is a flowchart illustrating a process for adding a forced termination target.

FIG. 29 illustrates a process for adding a forced termination target.

In step S241, the forced termination target addition processing unit 317 reads the name of an application package to be installed and the access permission information. The forced termination target addition processing unit 317 then causes the process to proceed to step S242.

In step S242, the forced termination target addition processing unit 317 reads the application type/access permission information correspondence table 520. The forced termination target addition processing unit 317 then causes the process to proceed to step S243.

In step S243, the forced termination target addition processing unit 317 identifies the type of application to which the target application belongs. The forced termination target addition processing unit 317 then causes the process to proceed to step S244.

In step S244, the forced termination target addition processing unit 317 reads the class/application type correspondence table 510. The forced termination target addition processing unit 317 then causes the process to proceed to step S245.

In step S245, the forced termination target addition processing unit 317 identifies the class number to which the application belongs. The forced termination target addition processing unit 317 then causes the process to proceed to step S246.

In step S246, the forced termination target addition processing unit 317 judges whether or not the application belongs to any class. If the application belongs to any class, the forced termination target addition processing unit 317 causes the process to proceed to step S247. On the other hand, if the application does not belong to any class, the forced termination target addition processing unit 317 terminates the process.

In step S247, the forced termination target addition processing unit 317 adds the application to the forced termination target application list 530. The forced termination target addition processing unit 317 then terminates the process.

Figure 30:
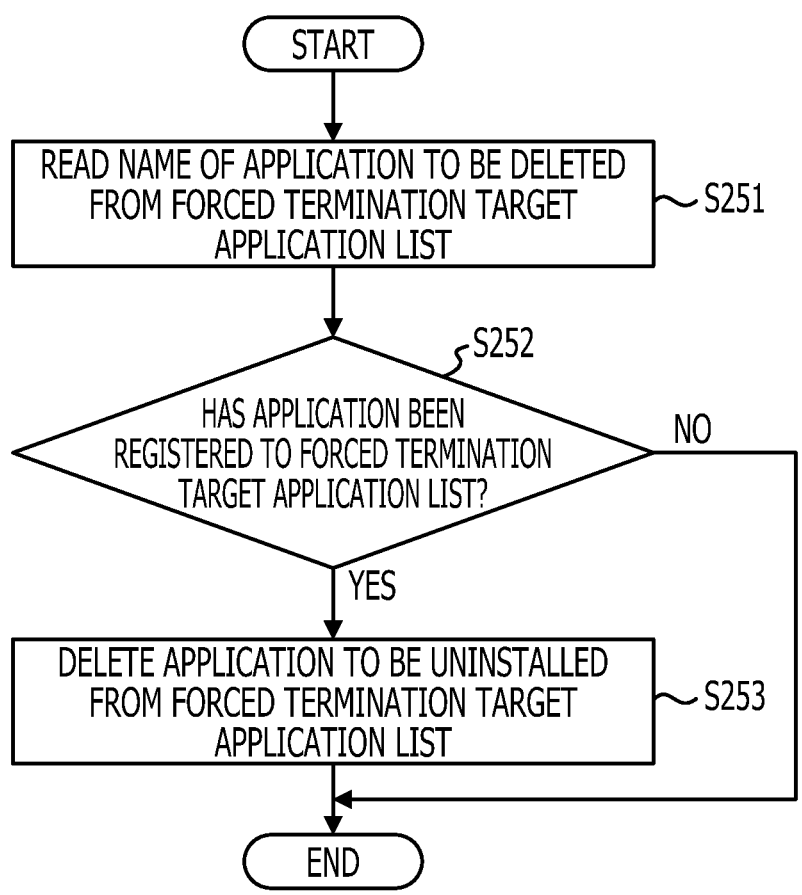
FIG. 30 is a flowchart illustrating a process for deleting the forced termination target.

FIG. 30 illustrates a process for deleting a forced termination target.

In step S251, the forced termination target deletion processing unit 314 reads the name of an application to be deleted from the forced termination target application list 530. The forced termination target deletion processing unit 314 then causes the process to proceed to step S252.

In step S252, the forced termination target deletion processing unit 314 judges whether or not the application has been registered to the forced termination target application list 530. If the application has been registered to the forced termination target application list 530, the forced termination target deletion processing unit 314 causes the process to proceed to step S253. On the other hand, if the application has not been registered to the forced termination target application list 530, the forced termination target deletion processing unit 314 terminates the process.

In step S253, the forced termination target deletion processing unit 314 deletes the application to be uninstalled from the forced termination target application list 530. The forced termination target deletion processing unit 314 then terminates the process.

Figure 31:
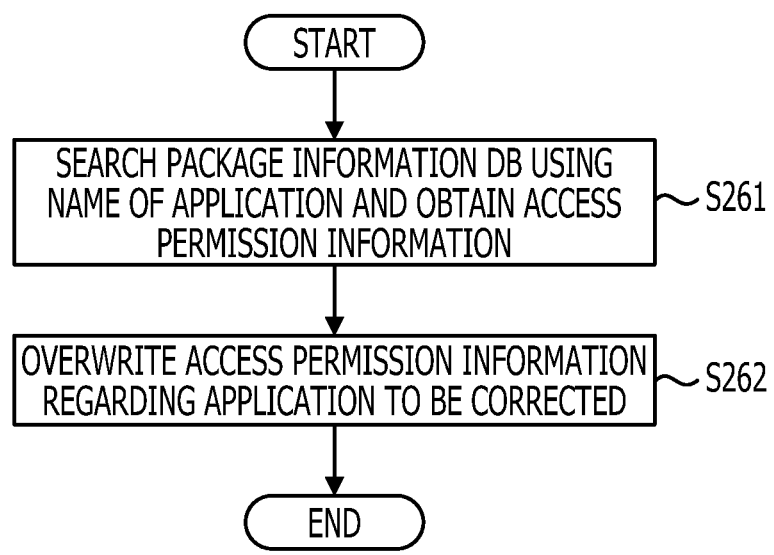
FIG. 31 is a flowchart illustrating a process for changing the class of the forced termination target.

FIG. 31 illustrates a process for changing a forced termination target class.

In step S261, the forced termination target class change unit 316 searches the package information DB 303 using the name of an application and obtains the access permission information. The forced termination target class change unit 316 then causes the process to proceed to step S262.

In step S262, the forced termination target class change unit 316 overwrites the access permission information regarding the application to be corrected. The forced termination target class change unit 316 then terminates the process.

According to the above embodiments, when the remaining amount of electric charge of the battery in the information processing apparatus becomes smaller than a certain value, an application operating in the background is terminated in accordance with the power consumption of the CPU that is executing the application. Therefore, since an application that causes the CPU to consume larger power is terminated first, the power consumed by the CPU becomes small, thereby extending the life of the battery.

Although the information processing systems according to the exemplary embodiments have been described, the present disclosure is not limited to these concrete embodiments that have been disclosed, and various modifications and alterations are possible without deviating from the scope of the claims.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An information processing apparatus, comprising:
a processor that executes a plurality of application programs;
a display that displays results of the execution of the plurality of application programs; and
a storage that stores a first table in which the plurality of application programs and a plurality of pieces of operation information corresponding to the plurality of application programs are associated with each other and recorded, and a second table in which the plurality of application programs and an order determined on the basis of power to be consumed by the processing unit to execute the plurality of application programs are associated with each other and recorded,
wherein, when the processor detects a certain piece of operation information, the processor refers to the first table to detect an application program corresponding to the certain piece of operation information and refers to the second table to detect a place of the detected application program in the order,
wherein, when the processor detects that a remaining amount of electric charge of a power supply that supplies power to the information processing apparatus has become lower than a threshold, the processor terminates, in accordance with the order, application programs among the plurality of application programs that are being executed other than an application program which result of execution is displayed on the display,
wherein the storage stores a third table in which a name of a certain application program is recorded, and
wherein, when the processor detects that the remaining amount of electric charge of the power supply has become lower than the threshold, the processor terminates, in accordance with the order, application programs among the plurality of application programs that are being executed other than the application program which result of execution is displayed on the display and the certain application program recorded in the third table.

2. The information processing apparatus according to claim 1,
wherein the processor terminates an application program that is ranked higher in the order among the plurality of application programs that are being executed other than the application program which result of execution is displayed on the display.

3. An information processing apparatus, comprising:
a processor that executes a plurality of application programs;
a display that displays results of the execution of the plurality of application programs; and
a storage that stores a first table in which the plurality of application programs and a plurality of pieces of operation information corresponding to the plurality of application programs are associated with each other and recorded, and a second table in which the plurality of application programs and an order determined on the basis of power to be consumed by the processing unit to execute the plurality of application programs are associated with each other and recorded,
wherein, when the processor detects a certain piece of operation information, the processor refers to the first table to detect an application program corresponding to the certain piece of operation information and refers to the second table to detect a place of the detected application program in the order, wherein, when the processor detects that a remaining amount of electric charge of a power supply that supplies power to the information processing apparatus has become lower than a threshold, the processor terminates, in accordance with the order, application programs among the plurality of application programs that are being executed other than an application program which result of execution is displayed on the display, and wherein the processor generates, on the basis of the first table and the second table, a fourth table at certain time intervals in which a name of an application program to be terminated is described.

4. The information processing apparatus according to claim 3, wherein the processor terminates an application program that is ranked higher in the order among the plurality of application programs that are being executed other than the application program which result of execution is displayed on the display.

5. An information processing apparatus, comprising:

a processor that executes a plurality of application programs;

a display that displays results of the execution of the plurality of application programs; and a storage that stores a first table in which the plurality of application programs and a plurality of pieces of operation information corresponding to the plurality of application programs are associated with each other and recorded, and a second table in which the plurality of application programs and an order determined on the basis of power to be consumed by the processing unit to execute the plurality of application programs are associated with each other and recorded, wherein, when the processor detects a certain piece of operation information, the processor refers to the first table to detect an application program corresponding to the certain piece of operation information and refers to the second table to detect a place of the detected application program in the order, wherein, when the processor detects that a remaining amount of electric charge of a power supply that supplies power to the information processing apparatus has become lower than a threshold, the processor terminates, in accordance with the order, application programs among the plurality of application programs that are being executed other than an application program which result of execution is displayed on the display, and wherein, when the processor detects a process for adding an application program, a process for deleting an application program, or a process for updating an application program, the processor generates, in accordance with the first table and the second table, a fourth table in which a name of an application program to be terminated is described.

6. The information processing apparatus according to claim 5, wherein the processor terminates an application program that is ranked higher in the order among the plurality of application programs that are being executed other than the application program which result of execution is displayed on the display.

7. A method for processing information, the method comprising:

executing a plurality of application programs;

displaying results of the execution of the plurality of application programs; and storing a first table in which the plurality of application programs and a plurality of pieces of operation information corresponding to the plurality of application programs are associated with each other and recorded and a second table in which the plurality of application programs and an order determined on the basis of power to be consumed to execute the plurality of application programs are associated with each other and recorded, wherein, by a processor, when a certain piece of operation information has been detected, the first table is referred to detect an application program corresponding to the certain piece of operation information, and the second table is referred to detect a place of the detected application program in the order, wherein, by a processor, when a remaining amount of electric charge of a power supply has become lower than a threshold, application programs among the plurality of application programs that are being executed other than an application program which result of execution is displayed are terminated in accordance with the order, wherein a third table in which a name of a certain application program is recorded is stored, and wherein, when the remaining amount of electric charge of the power supply has become lower than the threshold, application programs among the plurality of application programs that are being executed other than the application program which result of execution is displayed and the certain application program recorded in the third table are terminated.

8. The method for processing information according to claim 7, wherein an application program that is ranked higher in the order among the plurality of application programs that are being executed other than the application program which result of execution is displayed is terminated.

9. A method for processing information, the method comprising:

executing a plurality of application programs;

displaying results of the execution of the plurality of application programs; and storing a first table in which the plurality of application programs and a plurality of pieces of operation information corresponding to the plurality of application programs are associated with each other and recorded and a second table in which the plurality of application programs and an order determined on the basis of power to be consumed to execute the plurality of application programs are associated with each other and recorded, wherein, by a processor, when a certain piece of operation information has been detected, the first table is referred to detect an application program corresponding to the certain piece of operation information, and the second table is referred to detect a place of the detected application program in the order, wherein, by a processor, when a remaining amount of electric charge of a power supply has become lower than a threshold, application programs among the plurality of application programs that are being executed other than an application program which result of execution is displayed are terminated in accordance with the order, and wherein a fourth table in which a name of an application program to be terminated is described is generated at certain time intervals on the basis of the first table and the second table.

10. A method for processing information, the method comprising:
executing a plurality of application programs;
displaying results of the execution of the plurality of application programs; and
storing a first table in which the plurality of application programs and a plurality of pieces of operation information corresponding to the plurality of application programs are associated with each other and recorded and a second table in which the plurality of application programs and an order determined on the basis of power to be consumed to execute the plurality of application programs are associated with each other and recorded,
wherein, by a processor, when a certain piece of operation information has been detected, the first table is referred to detect an application program corresponding to the certain piece of operation information, and the second table is referred to detect a place of the detected application program in the order,
wherein, by a processor, when a remaining amount of electric charge of a power supply has become lower than a threshold, application programs among the plurality of application programs that are being executed other than an application program which result of execution is displayed are terminated in accordance with the order, and
wherein, when a process for adding an application program, a process for deleting an application program, or a process for updating an application program has been detected, a fourth table in which a name of an application program to be terminated is described is generated in accordance with the first table and the second table.

11. A non-transitory computer-readable recording medium, having stored therein a program for causing a computer to execute a digital signature process comprising:
executing a plurality of application programs;
displaying results of the execution of the plurality of application programs; and
storing a first table in which the plurality of application programs and a plurality of pieces of operation information corresponding to the plurality of application programs are associated with each other and recorded and a second table in which the plurality of application programs and an order determined on the basis of power to be consumed to execute the plurality of application programs are associated with each other and recorded,
wherein, when a certain piece of operation information has been detected, the first table is referred to detect an application program corresponding to the certain piece of operation information, and the second table is referred to detect a place of the detected application program in the order,
wherein, when a remaining amount of electric charge of a power supply has become lower than a threshold, application programs among the plurality of application programs that are being executed other than an application program which result of execution is displayed are terminated in accordance with the order, and
wherein the digital signature process comprises:
storing a third table in which a name of a certain application program is recorded, and
wherein, when the remaining amount of electric charge of the power supply has become lower than the threshold, the program causes the information processing apparatus to terminate, in accordance with the order, application programs among the plurality of application programs that are being executed other than the application program which result of execution is displayed and the certain application program recorded in the third table.

12. The non-transitory computer-readable recording medium according to claim 11,
wherein the digital signature process comprises:
terminating an application program that is ranked higher in the order among the plurality of application programs that are being executed other than the application program which result of execution is displayed.

13. A non-transitory computer-readable recording medium, having stored therein a program for causing a computer to execute a digital signature process comprising:
executing a plurality of application programs;
displaying results of the execution of the plurality of application programs; and
storing a first table in which the plurality of application programs and a plurality of pieces of operation information corresponding to the plurality of application programs are associated with each other and recorded and a second table in which the plurality of application programs and an order determined on the basis of power to be consumed to execute the plurality of application programs are associated with each other and recorded,
wherein, when a certain piece of operation information has been detected, the first table is referred to detect an application program corresponding to the certain piece of operation information, and the second table is referred to detect a place of the detected application program in the order, and
wherein, when a remaining amount of electric charge of a power supply has become lower than a threshold, application programs among the plurality of application programs that are being executed other than an application program which result of execution is displayed are terminated in accordance with the order, and
wherein the digital signature process comprises:
generating, on the basis of the first table and the second table, a fourth table at certain time intervals in which a name of an application program to be terminated is described.

14. A non-transitory computer-readable recording medium, having stored therein a program for causing a computer to execute a digital signature process comprising:
executing a plurality of application programs;
displaying results of the execution of the plurality of application programs; and
storing a first table in which the plurality of application programs and a plurality of pieces of operation information corresponding to the plurality of application programs are associated with each other and recorded and a second table in which the plurality of application programs and an order determined on the basis of power to be consumed to execute the plurality of application programs are associated with each other and recorded,
wherein, when a certain piece of operation information has been detected, the first table is referred to detect an application program corresponding to the certain piece of operation information, and the second table is referred to detect a place of the detected application program in the order, and
wherein, when a remaining amount of electric charge of a power supply has become lower than a threshold, application programs among the plurality of application programs that are being executed other than an application program which result of execution is displayed are terminated in accordance with the order, and wherein the digital signature process comprises:
generating, in accordance with the first table and the second table, a fourth table in which a name of an application program to be terminated is described, when a process for adding an application program, a process for deleting an application program, or a process for updating an application program has been detected.

15. An information processing apparatus comprising:
a memory that stores instructions for a process; and
a processor coupled to the memory and configured to execute the instructions of the process, the process including:
  specifying functions, accesses to which are permitted in accordance with access permission information which indicate an access to a function being permitted in case the access to the function occurs when executing an application program corresponding to the access permission information;
  predicting power to be consumed in accordance with a specified function in case an application program that accesses the specified function is to be executed;
  ranking application programs in accordance with the predicted power; and
  terminating an application program from among the application programs which are executed in the information processing apparatus, in accordance with a ranking of the application program, when a remaining amount of electric charge of a power supply that supplies power to the information processing apparatus becomes lower than a threshold.

* * * * *